US011774313B2

(12) United States Patent
Jentges et al.

(10) Patent No.: US 11,774,313 B2
(45) Date of Patent: Oct. 3, 2023

(54) SEALING ADAPTERS, PRESSURE TESTING SYSTEMS AND PRESSURE TESTING SYSTEM KITS INCLUDING THE SAME, AND ASSOCIATED METHODS

(71) Applicant: Climax Portable Machine Tools, Inc., Newberg, OR (US)

(72) Inventors: Raymond James Jentges, Newberg, OR (US); Scott J. Thiel, Sherwood, OR (US); Daniel M. Jensen, Hillsboro, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 230 days.

(21) Appl. No.: 17/011,816

(22) Filed: Sep. 3, 2020

(65) Prior Publication Data

US 2021/0072111 A1    Mar. 11, 2021

Related U.S. Application Data

(60) Provisional application No. 62/897,160, filed on Sep. 6, 2019.

(51) Int. Cl.
*G01M 3/28* (2006.01)
*F16J 15/32* (2016.01)

(52) U.S. Cl.
CPC ......... *G01M 3/2876* (2013.01); *F16J 15/32* (2013.01)

(58) Field of Classification Search
CPC .. G01M 3/022; G01M 3/2815; G01M 3/2853; G01M 3/22; G01M 3/28;

(Continued)

(56) References Cited

U.S. PATENT DOCUMENTS 3,781,043 A * 12/1973 Hagmann ............... F16L 23/18
  277/609
4,399,833 A *  8/1983 Holtgraver .......... F16K 27/0218
  137/454.2

(Continued)

FOREIGN PATENT DOCUMENTS

CN    110234913 A  *  9/2019  ........... F16J 15/0881

OTHER PUBLICATIONS

Climax, Calder USV-2-25T Hydro Pro Universal Straight Body Valve Tester Operating Manual, Nov. 2017.

*Primary Examiner* — Harshad R Patel
*Assistant Examiner* — Gedeon M Kidanu
(74) *Attorney, Agent, or Firm* — Kolitch Romano Dascenzo Gates LLC

(57) ABSTRACT

Sealing adapters, pressure testing systems, pressure testing system kits, and associated methods. A sealing adapter comprises an adapter body and a mounting flange extending radially away from the adapter body. The adapter body includes a first end with a first sealing surface, a second end, and a fluid passageway. The mounting flange defines a plurality of stud receivers configured to receive mounting studs of a device under test (DUT). A pressure testing system may comprise a frame, a clamp structure with at least one sealing adapter, and a pressurizing assembly for delivering a pressurized fluid to the DUT. A method of pressure testing a DUT may comprise operatively coupling the DUT to the pressure testing system and delivering the pressurized fluid to the DUT.

20 Claims, 12 Drawing Sheets

(58) Field of Classification Search
CPC . G01M 3/2807; G01M 3/2876; E21B 33/085; E21B 1/00; E21B 33/03; E21B 33/06; E21B 33/068; F16L 23/006; F16L 55/105; F16L 55/1108; F16L 55/1157; F16L 19/0237; F16L 2201/30; F16L 23/003; F16L 23/02; F16L 55/115; Y10S 285/901

See application file for complete search history.

(56) References Cited

U.S. PATENT DOCUMENTS

| | | | | |
|---|---|---|---|---|
| 4,813,456 | A * | 3/1989 | Emmitte, Jr. | G01M 3/2876 |
| | | | | 138/90 |
| 4,893,494 | A | 1/1990 | Hart | |
| 5,528,926 | A | 6/1996 | Emmitte, Jr. | |
| 5,576,479 | A | 11/1996 | Emmitte, Jr. | |
| 5,880,358 | A | 3/1999 | Emmitte, Jr. | |
| 6,948,717 | B1 * | 9/2005 | Carr | F16L 23/167 |
| | | | | 277/609 |
| 7,703,745 | B2 * | 4/2010 | Dalluge | F16L 23/003 |
| | | | | 251/305 |
| 9,267,350 | B1 * | 2/2016 | Pruitt | E21B 33/085 |
| 9,810,333 | B2 * | 11/2017 | Brazier | F16K 17/16 |
| 9,976,928 | B2 * | 5/2018 | Strait | F16L 23/006 |
| 10,788,153 | B2 * | 9/2020 | Fredenburg | F16L 57/005 |
| 11,008,825 | B2 * | 5/2021 | Fraczek | E21B 33/085 |
| 2018/0202585 | A1 * | 7/2018 | Smith | F16L 19/0237 |
| 2018/0202891 | A1 * | 7/2018 | Sorensen | F16K 35/14 |
| 2019/0250061 | A1 * | 8/2019 | Smith | F16L 55/1108 |
| 2020/0018661 | A1 * | 1/2020 | Smith | G01M 3/022 |

* cited by examiner

SEALING ADAPTERS, PRESSURE TESTING SYSTEMS AND PRESSURE TESTING SYSTEM KITS INCLUDING THE SAME, AND ASSOCIATED METHODS

RELATED APPLICATION

This application claims priority to U.S. Provisional Patent Application No. 62/897,160, entitled "STUDDED VALVE PRESSURE TESTING VALVE CLAMPING SYSTEMS," filed on Sep. 6, 2019, the disclosure of which is hereby incorporated by reference.

FIELD

The present disclosure relates generally to sealing adapters, pressure testing systems and pressure testing kits including the same, and associated methods.

BACKGROUND

Pressure testing systems for pressure testing devices under test (DUTs), such as valves, generally operate by supplying a pressurized fluid, such as air or water, to the DUT to pressurize the interior of the DUT. Such pressure testing systems typically require the DUT to be clamped within the pressure testing system such that the pressure testing system forms fluid-tight connections to the DUT. In some examples, the DUT includes projections such as mounting studs that must be removed from the DUT in order to accommodate the connections of the pressures testing system.

SUMMARY

Sealing adapters, pressure testing systems and pressure testing system kits including the same, and associated methods are disclosed herein. A sealing adapter for fluidly coupling a device under test (DUT), which may include a DUT body and a plurality of mounting studs extending from the DUT body, to a corresponding seal head of a pressure testing system comprises an adapter body and a mounting flange extending radially away from the adapter body. The adapter body includes a first end with a first sealing surface, a second end, and a fluid passageway. The first end and the second end are spaced apart from one another along an adapter axis of the sealing adapter. The mounting flange defines a plurality of stud receivers. The sealing adapter may be configured such that, during operative use of the sealing adapter, the sealing adapter is positioned between the DUT and the corresponding seal head such that each stud receiver of the plurality of stud receivers receives a respective mounting stud of the plurality of mounting studs.

In some examples, a pressure testing system for performing pressure testing of a DUT comprises a frame, a clamp structure supported by the frame and configured to operatively support the DUT, and a pressurizing assembly for delivering a pressurized fluid to the DUT. The clamp structure includes at least one sealing adapter.

In some examples, a method of pressure testing a DUT that includes a plurality of mounting studs comprises operatively coupling the DUT to the pressure testing system and delivering the pressurized fluid to the DUT. The operatively coupling the DUT to the pressure testing system may include mounting the at least one sealing adapter on the DUT such that each of the plurality of stud receivers receives a respective mounting stud of the plurality of mounting studs.

DESCRIPTION

Figure 1:
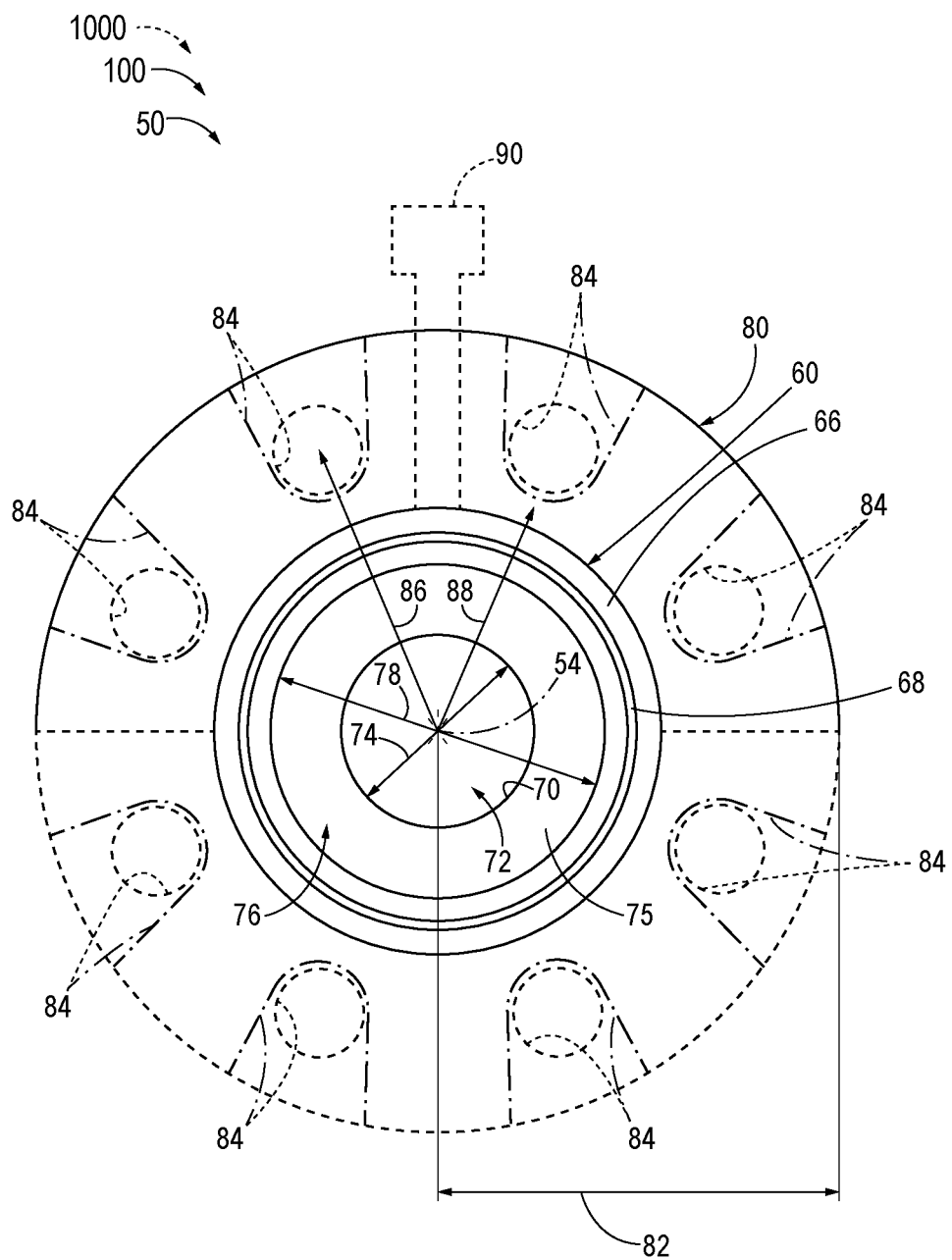
FIG. 1 is a schematic rear elevation view representing examples of sealing adapters according to the present disclosure.

FIGS. 1-15 provide examples of sealing adapters 50, of pressure testing systems 100, of pressure testing system kits 1000, and/or of methods 200 of utilizing pressure testing systems 100, according to the present disclosure. Elements that serve a similar, or at least substantially similar, purpose are labeled with like numbers in each of FIGS. 1-15, and these elements may not be discussed herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure. In general, in FIGS. 1-3, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
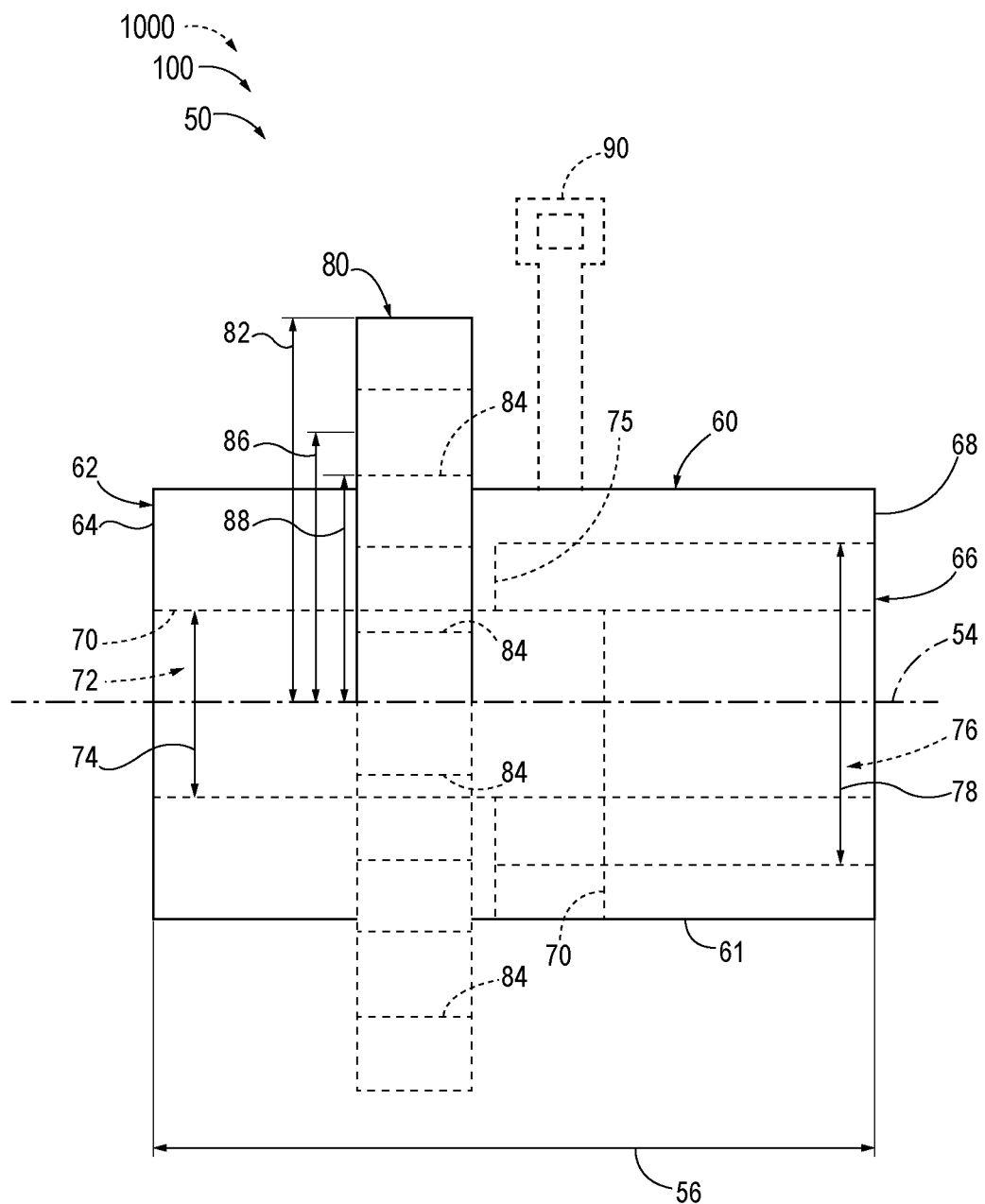
FIG. 2 is a schematic side elevation view representing examples of sealing adapters according to the present disclosure.
Figure 3:
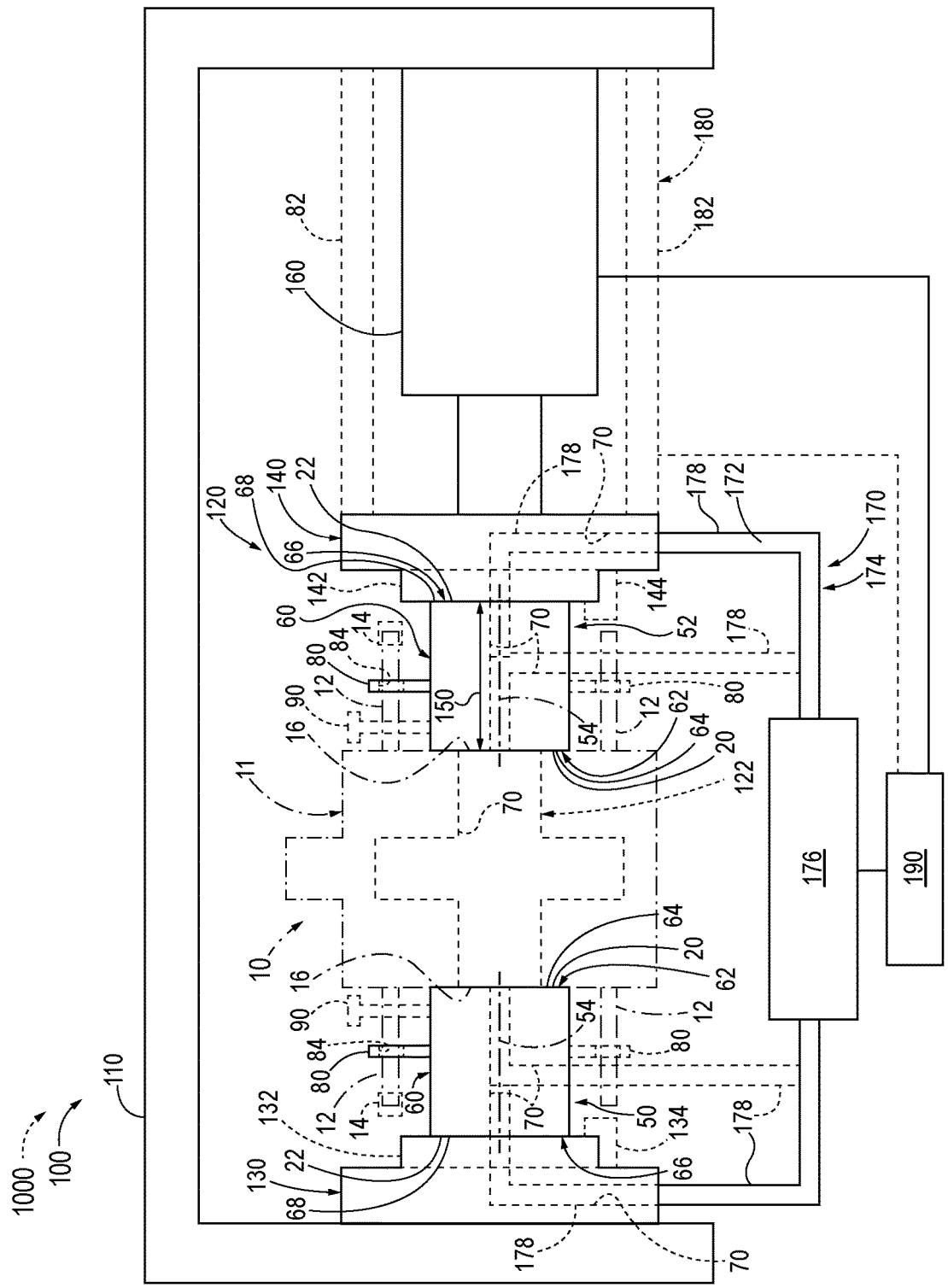
FIG. 3 is a schematic top plan view representing examples of pressure testing systems according to the present disclosure.

FIGS. 1-2 schematically illustrate examples of sealing adapters 50 according to the present disclosure, while FIG. 3 schematically illustrates examples of pressure testing systems 100 and/or of pressure testing system kits 1000 that include and/or utilize sealing adapters 50. As schematically illustrated in FIGS. 1-2, a sealing adapter 50 includes an adapter body 60 that defines a fluid passageway 70. As schematically illustrated in FIGS. 1-2, adapter body 60 includes a first end 62 (shown in FIG. 2) and a second end 66 that are spaced apart from one another along an adapter axis 54, and the adapter body includes an exterior surface 61 extending between first end 62 and second end 66. First end 62 of adapter body 60 includes a first sealing surface 64 (shown in FIG. 2), while second end 66 of adapter body may include a second sealing surface 68. In some examples, and as schematically illustrated in FIGS. 1-2, fluid passageway 70 fluidly interconnects first end 62 and second end 66. In some other examples, and as schematically illustrated in FIG. 2, fluid passageway 70 extends between first end 62 and an opening defined on exterior surface 61 of adapter body 60 between first end 62 and second end 66. As schematically illustrated in FIG. 2, each of first end 62 and/or second end 66 may be at least substantially flat and/or planar. In such examples, and as schematically illustrated in FIG. 2, first end 62 and second end 66 may extend at least substantially parallel to one another, and/or may extend at least substantially perpendicular to adapter axis 54.

FIG. 3 schematically illustrates examples of sealing adapter 50 in combination with examples of pressure testing system 100 in operative use to test a device under test (DUT) 10, such as to perform pressure testing of DUT 10. As schematically illustrated in FIG. 3, and as described in more detail herein, sealing adapter 50 is configured to be utilized in conjunction with DUT 10 to form a fluid-tight seal between DUT 10 and other components of pressure testing system 100. DUT 10 may include and/or be any of various devices to be pressure tested by pressure testing system 100. For example, DUT 10 may include and/or be a device that ordinarily is configured to be utilized to regulate a flow of a fluid under pressure and that is subject to pressure testing to ensure proper functionality of the DUT. As more specific examples, DUT 10 may include and/or be a valve, a straight pattern ball valve, a globe valve, a gate valve, a butterfly valve, and/or a check valve. In such examples, and as described in more detail herein, pressure testing system 100 may be configured to supply a flow of a pressurized fluid to DUT 10 under controlled conditions to verify proper functionality of the DUT.

As schematically illustrated in FIG. 3, pressure testing system 100 includes a frame 110, a clamp structure 120 supported by frame 110, and a pressurizing assembly 170 for delivering a pressurized fluid 172 to DUT 10 via one or more fluid openings 16 of DUT 10. Clamp structure 120 is configured to support DUT 10 within pressure testing system 100. Specifically, in some examples, and as schematically illustrated in FIG. 3, clamp structure 120 includes a first seal head 130, a second seal head 140 spaced apart from first seal head 130, and a force transmitting member 160 for clamping and supporting DUT 10 within clamp structure 120 between first seal head 130 and second seal head 140. Specifically, in such examples, force transmitting member 160 is configured to force DUT 10 into sealing engagement with at least a portion of clamp structure 120 when DUT 10 is positioned between first seal head 130 and second seal head 140.

As schematically illustrated in FIG. 3, clamp structure 120 additionally includes at least one sealing adapter 50 such that sealing adapter 50 is positioned between DUT 10 and first seal head 130 or between DUT 10 and second seal head 140 during operative use of pressure testing system 100. More specifically, and as schematically illustrated in FIG. 3, sealing adapter 50 may be a first sealing adapter 50 that is positioned between first seal head 130 and DUT 10, and clamp structure 120 additionally may include a second sealing adapter 52, which is another example of sealing adapter 50, that is positioned between DUT 10 and second seal head 140.

Any aspects, components, features, etc. of sealing adapter 50 as described herein may be understood as pertaining to first sealing adapter 50 and/or to second sealing adapter 52. Stated differently, as used herein, sealing adapter 50 also may be referred to as first sealing adapter 50 and/or as second sealing adapter 52, and references herein to first sealing adapter 50 and/or to second sealing adapter 52 may be understood as referring to sealing adapter 50 and/or any properties thereof.

As used herein, sealing adapters 50 and/or pressure testing system 100 may be described as being "in operative use" and/or as being "operatively utilized" when pressure testing system 100 and/or each sealing adapter 50 engages DUT 10 such that DUT 10 is positioned between, and fluidly coupled to, first seal head 130 and second seal head 140. In this manner, references within the present disclosure to pressure testing system 100, sealing adapter 50, and/or a component thereof in conjunction with DUT 10 (and/or a portion thereof) are intended to refer to a configuration in which pressure testing system 100 is operatively coupled to DUT 10 for pressure testing of the DUT, as described herein. In other examples, as used herein, sealing adapter 50 may be described as being "in operative use" and/or as being "operatively utilized" when sealing adapter 50 is installed on, is supported by, and/or otherwise engages DUT 10, such as to prepare DUT 10 for testing by pressure testing system 100. However, while the present disclosure generally describes examples in which pressure testing system 100 and/or sealing adapter 50 is operatively coupled to DUT 10, such examples are not intended to be limiting, and it is within the scope of the present disclosure that pressure testing system 100 and sealing adapter 50 are not always operatively coupled to and/or operatively utilized in conjunction with DUT 10.

In some examples, and as schematically illustrated in FIG. 3, DUT 10 includes a DUT body 11 and a plurality of mounting studs 12 extending away from DUT body 11. In particular, in such examples, mounting studs 12 may be configured to receive and/or at least partially support a fluid conduit, such as a pipe, to which DUT 10 is fluidly coupled when the DUT is in use in its intended application (e.g., when not under test). In some such examples, and as schematically illustrated in FIG. 3, DUT 10 additionally may include one or more stud retention features 14 configured to be operatively installed on mounting studs 12, such as to retain DUT 10 in fluid-tight engagement with adjacent fluid conduits during operative use of the DUT. In some examples, each mounting stud 12 is a threaded stud, and each stud retention feature 14 is a threaded nut that is configured to be threaded onto a respective mounting stud.

When utilizing prior art pressure testing systems, such as variants of pressure testing systems 100 that lack sealing adapters 50, to test such DUTs 10, it may be necessary to remove each mounting stud 12 from DUT body 11 such that the mounting studs do not obstruct or prevent the formation of a fluid seal between DUT 10 and each seal head (e.g., first seal head 130 and/or second seal head 140). In such examples, removal of the mounting studs may be a time- and/or labor-intensive process that results in an undesirable delay and/or expense in the pressure testing of DUT 10.

Accordingly, and as described in more detail herein, sealing adapters 50 according to the present disclosure are configured to fluidly couple DUT 10 to a corresponding seal head (e.g., first seal head 130 or second seal head 140) of pressure testing system 100 such that DUT 10 may be pressure tested without removing mounting studs 12. More specifically, and as schematically illustrated in FIG. 3, each sealing adapter 50 (e.g., first sealing adapter 50 and/or second sealing adapter 52) may be configured to space DUT 10 apart from each seal head (e.g., first seal head 130 or second seal head 140) by an adapter spacing distance 150. In some examples, adapter spacing distance 150 is at least substantially equal to an adapter length 56 of sealing adapter 50, as measured between first end 62 and second end 66 and along a direction parallel to adapter axis 54, as schematically illustrated in FIG. 2. As more specific examples, each of adapter length 56 and/or adapter spacing distance 150 may be at least 10 centimeters (cm), at least 30 cm, at least 50 cm, at least 100 cm, at most 150 cm, at most 70 cm, and/or at most 20 cm. In some examples, adapter spacing distance 150 and/or adapter length 56 corresponds to and/or exceeds a length of each mounting stud 12. In some such examples, and as schematically illustrated in FIG. 3, second end 66 of sealing adapter 50 may extend farther from DUT body 11 than does each mounting stud 12. Accordingly, configuring and/or selecting sealing adapter 50 such that adapter length 56 exceeds a length of each mounting stud 12 may ensure that each mounting stud extends between DUT body 11 and a corresponding seal head (e.g., first seal head 130 or second seal head 140) without obstruction during operative use of pressure testing system 100.

As additionally schematically illustrated in FIGS. 1-3, sealing adapter 50 includes a mounting flange 80 coupled to and extending radially away from adapter body 60. Mounting flange 80 defines a plurality of stud receivers 84 for receiving and/or accommodating mounting studs 12 of DUT 10 during operative use of pressure testing system 100, as described in more detail herein. In this manner, and as schematically illustrated in FIG. 3, sealing adapter 50 is configured such that, during operative use of sealing adapter 50, the sealing adapter is positioned between DUT 10 and the corresponding seal head (e.g., first seal head 130 or second seal head 140) such that each stud receiver 84 receives a respective mounting stud 12. In some examples, and as schematically illustrated in FIG. 3, sealing adapter 50 and/or mounting flange 80 may be configured such that one or more stud retention features 14 may be operatively installed onto (e.g., threaded onto) corresponding mounting studs 12 while the plurality of stud receivers 84 receives the corresponding plurality of mounting studs 12. Such a configuration may assist in restricting removal of sealing adapter 50 from mounting studs 12 when one or more stud retention features 14 are operatively installed onto the mounting studs. In some examples, and as schematically illustrated in FIGS. 2-3, mounting flange 80 may be positioned proximate first end 62 of adapter body 60 relative to second end 66 of the adapter body in order to accommodate stud retention features 14. More specifically, in such examples, mounting flange 80 may be positioned away from an end of each mounting stud 12 onto which stud retention feature 14 is operatively coupled.

Mounting flange 80 and/or stud receivers 84 may have various appropriate forms and/or structures for receiving mounting studs 12 during operative use of pressure testing system 100. In some examples, and as schematically illustrated in FIGS. 1-3, mounting flange 80 extends at least substantially perpendicular to adapter axis 54. In some examples, and as schematically illustrated in solid lines in FIGS. 1-2, mounting flange 80 extends partially circumferentially around adapter body 60. In other examples, and as schematically illustrated in solid and dashed lines in FIGS. 1-2, mounting flange 80 extends at least substantially, and optionally fully, circumferentially around adapter body 60. As more specific examples, mounting flange 80 may extend circumferentially around adapter body 60 with an angular extent that is at least 120 degrees, at least 150 degrees, at least 180 degrees, at least 210 degrees, at least 240 degrees, at least 270 degrees, at least 300 degrees, at least 330 degrees, at most 360 degrees, at most 315 degrees, at most 285 degrees, at most 255 degrees, at most 225 degrees, at most 195 degrees, at most 165 degrees, and/or at most 135 degrees. Configuring mounting flange 80 to extend around a greater angular extent of the circumference of adapter body 60 may facilitate supporting sealing adapter 50 upon mounting studs 12, as described herein. Alternatively, configuring mounting flange 80 to extend around a smaller angular extent of the circumference of adapter body 60 may correspond to a reduction in a material expense for the production of sealing adapter 50, and/or may facilitate resting sealing adapter 50 upon a ground surface without damage to mounting flange 80.

Each stud receiver 84 may have any of various forms and/or structures for receiving a respective mounting stud 12. As examples, each stud receiver 84 may include and/or be an aperture formed in the mounting flange (as schematically illustrated in dashed lines in FIG. 1), a notch formed in the peripheral region of the mounting flange (as schematically illustrated in dash-dot lines in FIG. 1), a cutout defined in a peripheral region of the mounting flange, a recess formed in the peripheral region of the mounting flange, a channel formed in the peripheral region of the mounting flange, and/or a groove formed in the peripheral region of the mounting flange.

With reference to FIGS. 1-2, each stud receiver 84 may be at least partially characterized by a distance between the stud receiver and adapter axis 54. For example, and as schematically illustrated in FIGS. 1-2, in an example in which each stud receiver 84 is an aperture formed in mounting flange 80, each stud receiver may be centered at a location that is spaced apart from adapter axis 54 by a stud receiver radius 86. Stud receiver radius 86 may assume various values, examples of which include at least 5 cm, at least 10 cm, at least 20 cm, at least 30 cm, at least 50 cm, at least 100 cm, at least 150 cm, at most 200 cm, at most 120 cm, at most 70 cm, at most 40 cm, at most 25 cm, at most 15 cm, and/or at most 7 cm. Additionally or alternatively, in some examples, and as schematically illustrated in FIGS. 1-2, mounting flange 80 and/or each stud receiver 84 may be at least partially characterized with reference to a maximum mounting flange radius 82 of mounting flange 80, as measured along a direction perpendicular to adapter axis 54 between adapter axis 54 and an outer perimeter of the mounting flange. As examples, mounting flange 80 may be configured such that a ratio of stud receiver radius 86 to maximum mounting flange radius 82 is at least 0.2:1, at least 0.5:1, at least 0.7:1, at most 0.95:1, at most 0.6:1, and/or at most 0.3:1. As another example, and as schematically illustrated in FIGS. 1-2, in an example in which each stud receiver 84 is a notch formed in the peripheral region of mounting flange 80, each stud receiver 84 may extend toward adapter axis 54 to a point that is spaced apart from adapter axis 54 by a minimum notch radius 88. Minimum notch radius 88 may assume various values, examples of which include at least 5 cm, at least 10 cm, at least 20 cm, at least 30 cm, at least 50 cm, at least 100 cm, at least 150 cm, at most 200 cm, at most 120 cm, at most 70 cm, at most 40 cm, at most 25 cm, at most 15 cm, and/or at most 7 cm. Additionally or alternatively, mounting flange 80 may be configured such that a ratio of minimum notch radius 88 to maximum mounting flange radius 82 is at least 0.2:1, at least 0.5:1, at least 0.7:1, at most 0.95:1, at most 0.6:1, and/or at most 0.3:1. Configuring mounting flange 80 such that each stud receiver 84 is a notch formed in the peripheral region of the mounting flange may enable the sealing adapter 50 to be utilized in conjunction with a plurality of distinct DUTs 10, such as DUTs that include mounting studs 12 positioned with distinct bolt circle diameters. Stated differently, in such examples, each stud receiver 84 may be configured to receive mounting studs 12 that are positioned within a range of radial positions relative to adapter axis 54 during operative use of sealing adapter 50.

Mounting flange 80 may include any of various numbers of stud receivers 84, such as may correspond to, be equal to, and/or be greater than a number of mounting studs 12 of DUT 10. As examples, mounting flange 80 may include at least four stud receivers 84, at least six stud receivers 84, at least 10 stud receivers 84, at least 15 stud receivers 84, at most 20 stud receivers 84, at most 13 stud receivers 84, at most eight stud receivers 84, and/or at most five stud receivers 84.

In some examples, sealing adapter 50 is configured to be at least partially supported by DUT 10 during operative use of pressure testing system 100 and/or while preparing pressure testing system 100 for operative use to test DUT 10. As an example, mounting flange 80 and/or the plurality of stud receivers 84 may be configured to engage the plurality of mounting studs 12 of DUT 10 such that sealing adapter 50 is at least partially supported by DUT 10 during operative use of sealing adapter 50. As a more specific example, mounting flange 80 may be configured such that, when each stud receiver 84 receives the respective mounting stud 12, the plurality of mounting studs 12 at least partially supports sealing adapter 50. In this manner, sealing adapter 50 may be configured such that mounting the sealing adapter on mounting studs 12 supports the sealing adapter such that fluid passageway 70 of the sealing adapter is operatively aligned with a corresponding fluid opening 16 of DUT 10.

In some examples, sealing adapter 50 includes one or more features to facilitate selectively and operatively installing the sealing adapter relative to DUT 10 and/or relative to another component of pressure testing system 100. As an example, and as schematically illustrated in FIGS. 1-3, sealing adapter 50 may include a lifting member 90 that is configured to be engaged by a lifting apparatus (e.g., a hoist, a crane, etc.) to lift sealing adapter 50, such as to position sealing adapter 50 relative to DUT 10. As examples, lifting member 90 may include and/or be a hook, a ring, a shackle, a chain link, etc. In some examples, adapter body 60 and/or mounting flange 80 includes and/or defines lifting member 90. As a more specific example, lifting member 90 may be an aperture defined in mounting flange 80 that is configured to be engaged by the lifting apparatus. In other examples, lifting member 90 may include and/or be a component that extends away from adapter body 60. Lifting member 90 may be positioned to be at least substantially aligned with (e.g., vertically aligned with) a center of mass of sealing adapter 50, such as to ensure that adapter axis 54 remains at least substantially horizontal as sealing adapter 50 is lifted and suspended by the lifting apparatus.

Sealing adapter 50 may include and/or be configured to accommodate any of various structures and/or features for forming a fluid-tight seal with DUT 10, with first seal head 130, and/or with second seal head 140. In some examples, and as schematically illustrated in FIG. 3, first sealing surface 64 of sealing adapter 50 (e.g., of first sealing adapter 50 and/or of second sealing adapter 52) is configured to receive and/or engage a first sealing component 20 to form a fluid seal between the first sealing surface and fluid opening 16 of DUT 10. Similarly, in some examples, and as schematically illustrated in FIG. 3, second sealing surface 68 of sealing adapter 50 (e.g., of first sealing adapter 50 and/or of second sealing adapter 52) is configured to receive a second sealing component 22 to form a fluid seal between the second sealing surface and the corresponding seal head (e.g., first seal head 130 or second seal head 140). First sealing component 20 and second sealing component 22 each may include and/or be any of various components for forming a fluid-tight seal, examples of which include a sealing gasket, a ring type joint (RTJ) gasket, an O-ring, a sealing surface, and/or a polyurethane sealing surface. In such examples, first sealing surface 64 and/or second sealing surface 68 may be specifically configured (e.g., shaped, dimensioned, etc.) to engage and/or accommodate the corresponding sealing component. As an example, and as schematically illustrated in FIG. 1 in conjunction with second sealing surface 68, each of first sealing surface 64 and/or second sealing surface 68 may include and/or be a circular channel defined in adapter body 60 (e.g., in first end 62 or in second end 66) that is configured to at least partially receive the corresponding sealing component (e.g., first sealing component 20 or second sealing component 22).

As described herein, fluid passageway 70 of sealing adapter 50 generally is configured to support a flow of pressurized fluid 172 to convey the pressurized fluid to and/or from DUT 10. In some examples, fluid passageway 70 of sealing adapter 50 varies in shape and/or dimension across a length of sealing adapter 50, such as along an extent of adapter axis 54. As an example, and as schematically illustrated in FIGS. 1-2, fluid passageway 70 of sealing adapter 50 may define a first passageway chamber 72 proximate to first end 62 of sealing adapter 50 (shown in FIG. 2) and/or a second passageway chamber 76 proximate to second end 66 of sealing adapter 50. In such examples, and as schematically illustrated in FIGS. 1-2, first passageway chamber 72 may have and/or be characterized by a first passageway diameter 74, and/or second passageway chamber 76 may have and/or be characterized by a second passageway diameter 78. In some examples, and as schematically illustrated in FIGS. 1-2, first passageway dimeter 74 is different than second passageway diameter 78, such that fluid passageway 70 of sealing adapter 50 includes a shoulder 75 that separates, delineates, partitions, and/or otherwise extends between first passageway chamber 72 and second passageway chamber 76. As schematically illustrated in FIGS. 1-2, shoulder 75 may include and/or be a surface within sealing adapter 50 that extends at least substantially perpendicular to adapter axis 54. In some examples, and as schematically illustrated in FIGS. 1-2, second passageway diameter 78 may be greater than first passageway diameter 74. In such examples, and as schematically illustrated in FIGS. 1-2, first passageway diameter 74 and second passageway diameter 78 each may be measured along a direction perpendicular to adapter axis 54. In other examples, fluid passageway 70 of sealing adapter 50 is at least substantially consistent in shape and/or dimension across a length of sealing adapter 50, such as along an extent of adapter axis 54. For example, and as additionally schematically illustrated in dashed lines in FIG. 2, fluid passageway 70 may extend from first end 62 to second end 66 of sealing adapter 50 with an inner diameter that is at least substantially constant along the length of sealing adapter 50, such that sealing adapter 50 lacks shoulder 75. Such examples equivalently may be described as examples in which first passageway chamber 72 extends fully from first end 62 to second end 66 of sealing adapter 50, such that fluid passageway 70 is characterized by first passageway diameter 74 at each of first end 62 and second end 66.

In some examples, and as schematically illustrated in FIGS. 1-2, each of first passageway chamber 72 and/or second passageway chamber 76 is at least substantially cylindrical. However, this is not required of all examples of sealing adapter 50, and it is additionally within the scope of the present disclosure that each of first passageway chamber 72 and/or second passageway chamber 76 may have a shape that is non-cylindrical, such as a shape that is frusto-conical, and/or that first passageway chamber 72 and second passageway chamber 76 have distinct shapes. In some examples, fluid passageway 70 of sealing adapter 50 is at least substantially cylindrical with a diameter that is at least substantially constant and/or smoothly continuous. In such examples, fluid passageway 70 may be described as defining first passageway chamber 72 but not second passageway chamber 76.

First seal head 130 and/or second seal head 140 each may include and/or exhibit various structures and/or configurations for engaging the corresponding sealing adapter 50 (e.g., first sealing adapter 50 or second sealing adapter 52) and/or for delivering pressurized fluid 172 to DUT 10. In some examples, and as schematically illustrated in FIG. 3, first seal head 130 includes a first seal plate 132 that is configured to sealingly engage first sealing adapter 50 and/or DUT 10 during operative use of pressure testing system 100. Similarly, in some examples, and as schematically illustrated in FIG. 3, second seal head 140 includes a second seal plate 142 that is configured to sealingly engage second sealing adapter 52 and/or DUT 10 during operative use of pressure testing system 100. In some such examples, first seal plate 132 and/or second seal plate 142 may be configured to be selectively and repeatedly removed from and assembled onto a remainder of the corresponding seal head (i.e., first seal head 130 or second seal head 140) without damage to the corresponding seal head. In this manner, first seal plate 132 and/or second seal plate 142 may be selected and/or utilized based upon a configuration of sealing adapter 50 and/or of DUT 10, such as to interface with a specific second sealing component 22 to form a fluid-tight connection with sealing adapter 50. As a more specific example, and as schematically illustrated in FIG. 3, first seal head 130 may include a first seal plate cradle 134 that is configured to receive and support first seal plate 132 when the first seal plate is operatively installed in the first seal head. Similarly, and as additionally schematically illustrated in FIG. 3, second seal head 140 may include a second seal plate cradle 144 that is configured to receive and support second seal plate 142 when the second seal plate is operatively installed in the second seal head. Examples of seal heads (e.g., of first seal head 130 and/or of second seal head 140), of seal plates (e.g., of first seal plate 132 and/or of second seal plate 142), of seal plate cradles (e.g., of first seal plate cradle 134 and/or of second seal plate cradle 144), and/or of other components of pressure testing systems 100 according to the present disclosure are disclosed in U.S. Pat. No. 5,528,926, the complete disclosure of which is hereby incorporated by reference.

While the present disclosure generally relates to examples in which each sealing adapter 50 is configured to be selectively assembled to and/or fluidly coupled to the corresponding seal head (e.g., first seal head 130 or second seal head 140), this is not required of all examples of pressure testing system 100. For example, it is additionally within the scope of the present disclosure that each sealing adapter 50 may be fixedly and/or permanently coupled to the corresponding seal head and/or to the corresponding seal plate of the corresponding seal head (e.g., first seal plate 132 or second seal plate 142) in such a manner that the sealing adapter is not configured to be removed from the corresponding seal head. As more specific examples, each sealing adapter 50 may be riveted to, welded to, bonded to, and/or integrally formed with the corresponding seal head and/or seal plate thereof. In such examples, the corresponding seal head and/or seal plate thereof (e.g., first seal head 130, first seal plate 132, second seal head 140, and/or second seal plate 142) may be described as including the corresponding sealing adapter (e.g., first sealing adapter 50 or second sealing adapter 52). As used herein, the term "permanent," as used to describe a bonding and/or coupling between two or more components, is to be understood as indicating that the components are not configured to be removed from one another without causing damage to one or more of the components.

As discussed, pressure testing system 100 includes force transmitting member 160 for clamping DUT 10 within clamp structure 120. More specifically, in some examples, force transmitting member 160 is configured to apply a compressive force upon DUT 10 that is sufficient to form a fluid-tight seal between DUT 10 and clamp structure 120 to restrict leakage of pressurized fluid 172 during operative use of pressure testing system 100. Force transmitting member 160 may include and/or be any of various devices and/or mechanisms for clamping DUT 10 within clamp structure 120 to form a fluid-tight seal between DUT 10 and each sealing adapter 50. As examples, force transmitting member 160 may include and/or be a lead screw, a hydraulic ram, and/or a hydraulic cylinder, such as may be configured to selectively translate first seal head 130 toward second seal head 140 and/or vice versa. In some examples, force transmitting member 160 is configured to apply the compressive force to DUT 10 with a magnitude that is sufficient to support and maintain DUT 10 in position relative to clamp structure 120 during operative use of pressure testing system 100. Stated differently, during operative use of pressure testing system 100, DUT 10 may be supported within clamp structure 120 by each sealing adapter 50 and/or by the compressive force exerted upon DUT 10 by force transmitting member 160. Force transmitting member 160 may be configured to apply the compressive force to DUT 10 with various magnitudes appropriate for forming and maintaining a fluid-tight seal, examples of which include at least 500 kiloNewtons (kN), at least 1,000 kN, at least 1,500 kN, at least 2,000 kN, at least 2,500 kN at least 3,000 kN, at most 3,500 kN, at most 2,700 kN, at most 2,200 kN, at most 1,700 kN, at most 1,200 kN, and at most 700 kN.

Pressurizing assembly 170 may include various structures and/or components for providing pressurized fluid 172 to DUT 10 during operative use of pressure testing system 100. In some examples, and as schematically illustrated in FIG. 3, pressurizing assembly 170 may include a pressurized fluid circuit 174 through which pressurized fluid 172 flows during operative use of pressure testing system 100. Pressurizing assembly 170 additionally may include a pressurized fluid supply source 176 that is configured to generate and/or pressurize the pressurized fluid and to flow the pressurized fluid through the pressurized fluid circuit. Pressurized fluid supply source 176 additionally may include a fluid reservoir that stores a volume of pressurized fluid 172, such as to facilitate maintaining a consistent pressure and/or volume of pressurized fluid 172 within pressurized fluid circuit 174.

Pressurized fluid circuit 174 may include and/or be one or more structures that are fluidly coupled to one another and to pressurized fluid supply source 176 to flow pressurized fluid 172 to DUT 10. As an example, and as schematically illustrated in FIG. 3, pressurized fluid circuit 174 may include one or more pressurized fluid supply lines 178, such as hoses, pipes, and/or other fluid conduits, that are fluidly coupled to pressurized fluid supply source 176 and/or to one or more components of clamp structure 120. In some examples, and as additionally schematically illustrated in FIG. 3, pressurized fluid circuit 174 additionally or alternatively may include a clamp structure fluid conduit 122 that is formed by one or more components of clamp structure 120. For example, clamp structure fluid conduit 122 may be at least partially formed by each of first seal head 130, first seal plate 132, first sealing adapter 50, DUT 10, second sealing adapter 52, second seal head 140, and/or second seal plate 142. In this manner, clamp structure fluid conduit 122 may be a fluid-tight fluid conduit that extends between and includes first seal head 130 and second seal head 140. In such examples, each component of clamp structure 120 that forms a portion of clamp structure fluid conduit 122 may be described as including and/or defining a respective fluid passageway 70 that forms the portion of the clamp structure fluid conduit. That is, as used herein, references to fluid passageway 70 may refer to a passageway and/or a conduit for pressurized fluid 172 that is formed in any of various components of pressure testing system 100. In the example of FIG. 3, each of first seal head 130, first seal plate 132, first sealing adapter 50, DUT 10, second sealing adapter 52, second seal head 140, and second seal plate 142 includes a respective fluid passageway 70 such that clamp structure fluid conduit 122 includes, and is collectively defined by, each respective fluid passageway 70.

In some examples, and as schematically illustrated in FIG. 3, each of first seal head 130 and/or second seal head 140 may define a respective fluid passageway 70. Additionally or alternatively, in some examples, one or both of first seal head 130 and second seal head 140 may define an internal passage through which at least a portion of a respective pressurized fluid supply line 178 extends, such that the portion of the pressurized fluid supply line extending within clamp structure 120 forms a portion of clamp structure fluid conduit 122. In some such examples, sealing adapter 50, clamp structure 120, and/or pressurized fluid circuit 174 may be configured to support a direct connection between a given (e.g., a particular) pressurized fluid supply line 178 and a respective sealing adapter 50 (e.g., first sealing adapter 50 or second sealing adapter 52). As a more specific example, sealing adapter 50, clamp structure 120, and/or pressurized fluid circuit 174 may be configured such that a portion of pressurized fluid supply line 178 extends through first seal head 130 or second seal head 140 and is directly coupled to second end 66 of the respective sealing adapter 50 during operative use of pressure testing system 100. Additionally or alternatively, in some examples, clamp structure fluid conduit 122 may not extend through one or both of first seal head 130 and second seal head 140. For example, and as discussed, fluid passageway 70 of the sealing adapter (e.g., of first sealing adapter 50 and/or of second sealing adapter 52) may extend from first end 62 of the sealing adapter to an opening defined on an exterior surface 61 of adapter body 60 (labeled in FIG. 2). Accordingly, in such examples, and as schematically illustrated in FIG. 3, sealing adapter 50 may be configured such that pressurized fluid supply line 178 is directly coupled to sealing adapter 50 at a location that is external to the corresponding seal head (e.g., first seal head 130 or second seal head 140), such that pressurized fluid circuit 174 bypasses the corresponding seal head during operative use of pressure testing system 100. In some such examples, second sealing surface 68 of sealing adapter 50 is obviated by the lack of a fluid connection between second end 66 of the sealing adapter and the corresponding seal head, and is thus omitted.

Pressurizing assembly 170 may be configured to utilize any of various fluids during operative use of pressure testing system 100. As examples, pressurized fluid 172 may include and/or be a fluid, a gas, air, nitrogen, a liquid, glycol, water, and/or an oil. Additionally, pressurizing assembly 170 and/or pressurized fluid supply source 176 may be configured to pressurize the pressurized fluid to various suitable fluid pressures for testing DUT, examples of which include at least 5 bar, at least 10 bar, at least 30 bar, at least 100 bar, at least 300 bar, at least 500 bar, at least 1,000 bar, at most 1,500 bar, at most 700 bar, at most 200 bar, at most 70 bar, at most 20 bar, and/or at most 7 bar.

Figure 4:
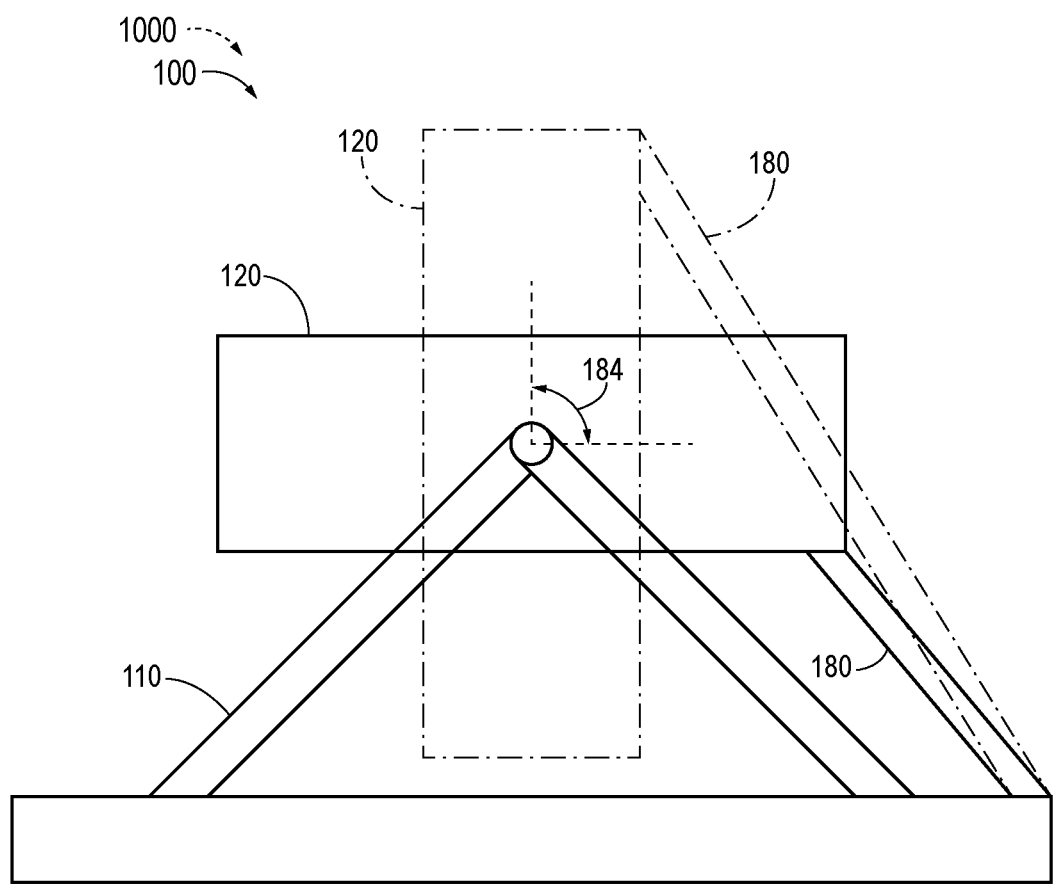
FIG. 4 is a schematic side elevation view representing examples of DUT rotation mechanisms according to the present disclosure.

In some examples, and as schematically illustrated in FIG. 3, pressure testing system 100 additionally may include a DUT rotation mechanism 180 for selectively rotating clamp structure 120 (and hence DUT 10) relative to frame 110 during operative use of pressure testing system 100. In such examples, DUT rotation mechanism 180 may include and/or be any of various mechanisms for selectively rotating clamp structure 120 relative to frame 110. As a more specific example, and as schematically illustrated in FIG. 3, DUT rotation mechanism 180 may include and/or be at least one lifting hydraulic cylinder 182 that is operatively coupled to frame 110 and to clamp structure 120. FIG. 4 is a schematic representation of an example of the operation of DUT rotation mechanism 180. As schematically illustrated in FIG. 4, DUT rotation mechanism 180 may be configured to rotate clamp structure 120 relative to frame 110 through a DUT rotation angle 184, such as may be at least 10 degrees, at least 30 degrees, at least 45 degrees, at least 60 degrees, at least 75 degrees, at most 90 degrees, at most 65 degrees, at most 50 degrees, at most 35 degrees, and/or at most 20 degrees. More specifically, FIG. 4 schematically illustrates an example in which DUT rotation mechanism 180 rotates clamp structure 120 relative to frame 110 from the configuration illustrated in solid lines to the configuration illustrated in dash-dot lines through DUT rotation angle 184 that is approximately 90 degrees.

In some examples, and as further schematically illustrated in FIG. 3, pressure testing system 100 additionally includes a testing system controller 190 configured to at least partially control the operation of one or more components and/or aspects of pressure testing system 100. As examples, testing system controller 190 may be configured to at least partially regulate the magnitude of the compressive force exerted by force transmitting member 160; the fluid pressure of pressurized fluid 172 produced by pressurized fluid supply source 176; and/or DUT rotation angle 184 produced by DUT rotation mechanism 180. In some examples, testing system controller 190 is configured to operate at least partially automatically. For example, testing system controller 190 may be configured to perform one or more components of methods 200 discussed below without human intervention. Additionally or alternatively, testing system controller 190 may be configured to operate (and/or to perform one or more components of methods 200) at least partially responsive to a user input, such as an input by a human user of pressure testing system 100.

Testing system controller 190 may include and/or be any of various devices that are configured to perform the functions of the controller discussed herein. For example, testing system controller 190 may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure. Additionally or alternatively, testing system controller 190 may include, or be configured to read, non-transitory computer readable storage, or memory, media suitable for storing computer-executable instructions, or software, for implementing methods, or steps of methods, according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

In some examples, and as schematically indicated in FIG. 3, pressure testing system 100 and/or one or more components thereof also may be components of a pressure testing system kit 1000 for performing pressure testing of DUT 10. For example, and as discussed, each sealing adapter 50 (e.g., first sealing adapter 50 and/or second sealing adapter 52) may be shaped, sized, dimensioned, and/or otherwise configured at least partially based upon one or more properties of DUT 10, such as a size of DUT 10 (and/or of fluid opening 16 thereof) and/or a pressure testing requirement associated with DUT 10. Accordingly, in some examples, pressure testing system kit 1000 includes a plurality of sealing adapters 50 of various configurations, such that each sealing adapter 50 that is utilized for operative testing of a given DUT 10 may be selected from the plurality of sealing adapters 50 based upon one or more properties of DUT 10. As more specific examples, the plurality of sealing adapters 50 may be characterized by distinct adapter lengths 56, distinct maximum mounting flange radii 82, distinct stud receiver radii 86, distinct minimum notch radii 88, compatibility with distinct sealing components (e.g., first sealing component 20 and/or second sealing component 22), distinct maximum pressure ratings, etc. Pressure testing system kit 1000 additionally or alternatively may include suitable components of pressure testing system 100 as described herein in various combinations and/or configurations, such as in an at least partially disassembled configuration. In this manner, pressures testing system kit 1000 may include two or more components that are configured to be assembled together to form at least a portion of pressure testing system 100 and/or to prepare pressures testing system 100 for operative use to test DUT 10.

Figure 6:
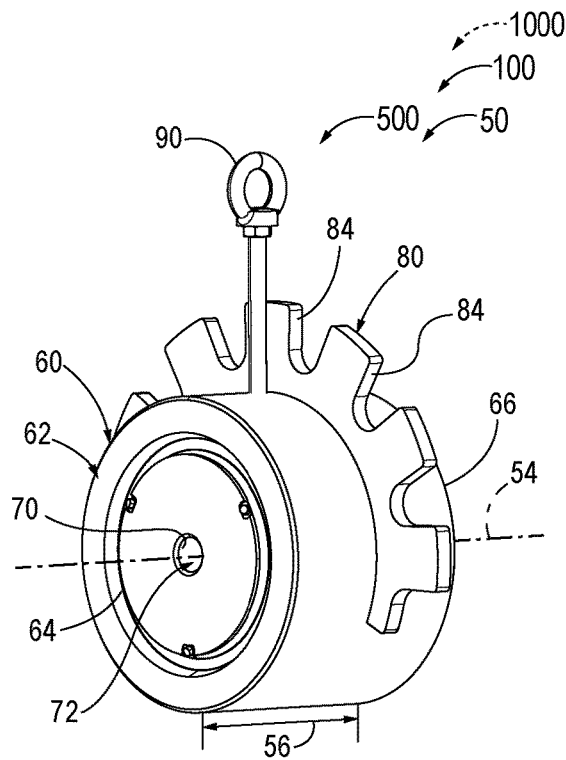
FIG. 6 is a front side isometric view of the sealing adapter of FIG. 5.
Figure 7:
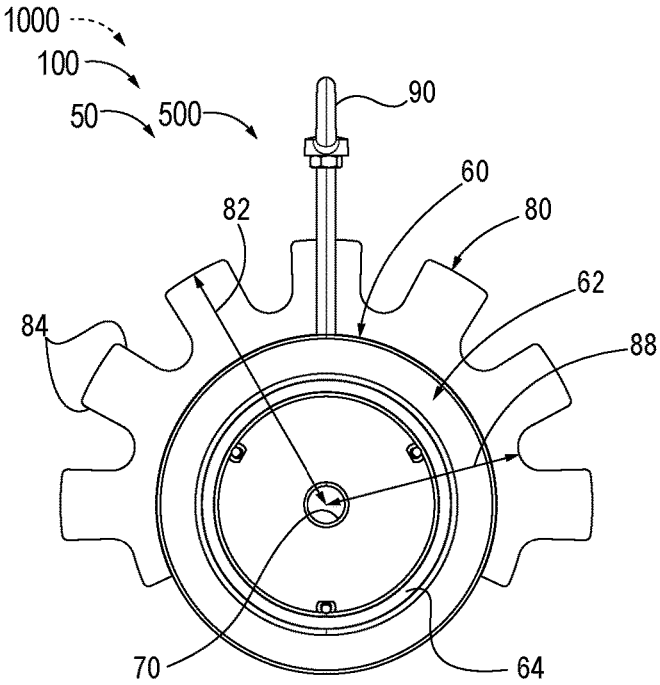
FIG. 7 is a front elevation view of the sealing adapter of FIGS. 5-6.
Figure 8:
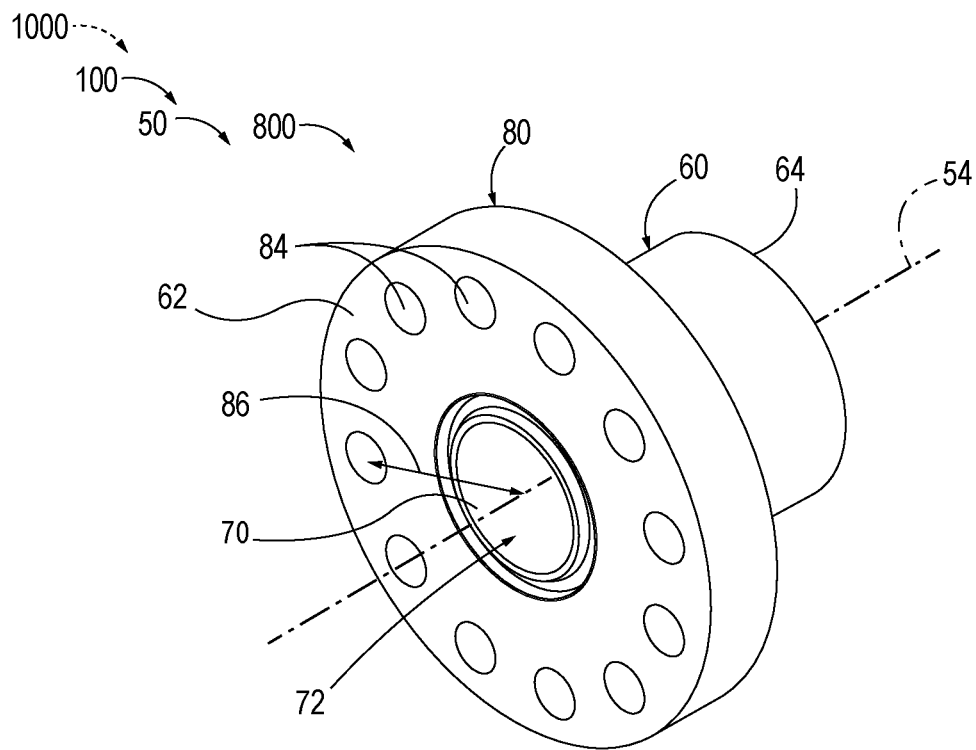
FIG. 8 is a top front side isometric view illustrating another example of a sealing adapter according to the present disclosure.
Figure 9:
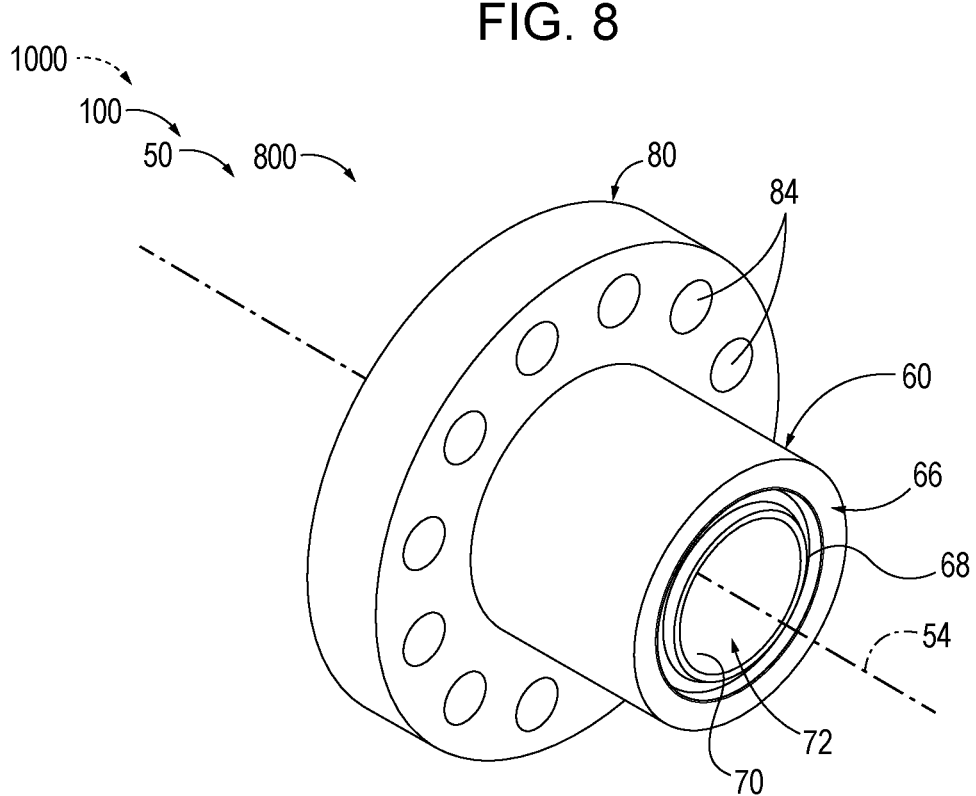
FIG. 9 is a top rear side isometric view of the sealing adapter of FIG. 8.

Turning now to FIGS. 5-14, FIGS. 5-7 are less schematic illustrations of a sealing adapter 500, which is an example of sealing adapter 50, while FIGS. 8-9 are less schematic illustrations of a sealing adapter 800, which is another example of sealing adapter 50, and FIGS. 10-14 are less schematic illustrations of sealing adapter 500 in combination with aspects of pressure testing system 100.

Figure 5:
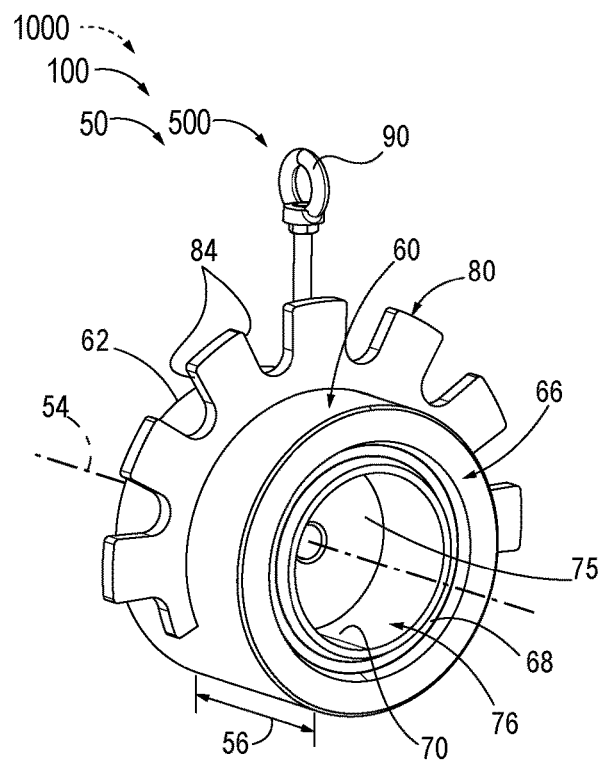
FIG. 5 is a rear side isometric view illustrating an example of a sealing adapter according to the present disclosure.

In the example of FIGS. 5-7, sealing adapter 500 includes mounting flange 80 in the form of a flange that extends partially circumferentially around adapter body 60 and that defines a plurality of stud receivers 84 in the form of notches formed in the mounting flange. In the example of FIGS. 5-7, mounting flange 80 is spaced apart from each of first end 62 and second end 66 of adapter body 60. In the example of FIGS. 5-7, sealing adapter 500 additionally includes lifting member 90 in the form of a ring extending above mounting flange 80. In the example of FIGS. 5-7, fluid passageway 70 of sealing adapter 500 defines first passageway chamber 72 and second passageway chamber 76 as described herein, separated by shoulder 75 (visible in FIG. 5).

In the example of FIGS. 8-9, mounting flange 80 of sealing adapter 800 extends fully circumferentially around adapter body 60. In the example of FIGS. 8-9, mounting flange 80 extends from first end 62 of adapter body 60 such that first end 62 may be described as including, forming, and/or at least partially defining mounting flange 80 (or vice versa). In the example of FIGS. 8-9, mounting flange 80 defines a plurality of stud receivers 84 in the form of apertures extending through the mounting flange. Additionally, in the example of FIGS. 8-9, fluid passageway 70 of sealing adapter 800 defines first passageway chamber 72 that extends fully from first end 62 to second end 66. That is, in the example of FIGS. 8-9, fluid passageway 70 of sealing adapter 800 defines an internal diameter that is at least substantially constant across a length of the sealing adapter.

Figure 10:
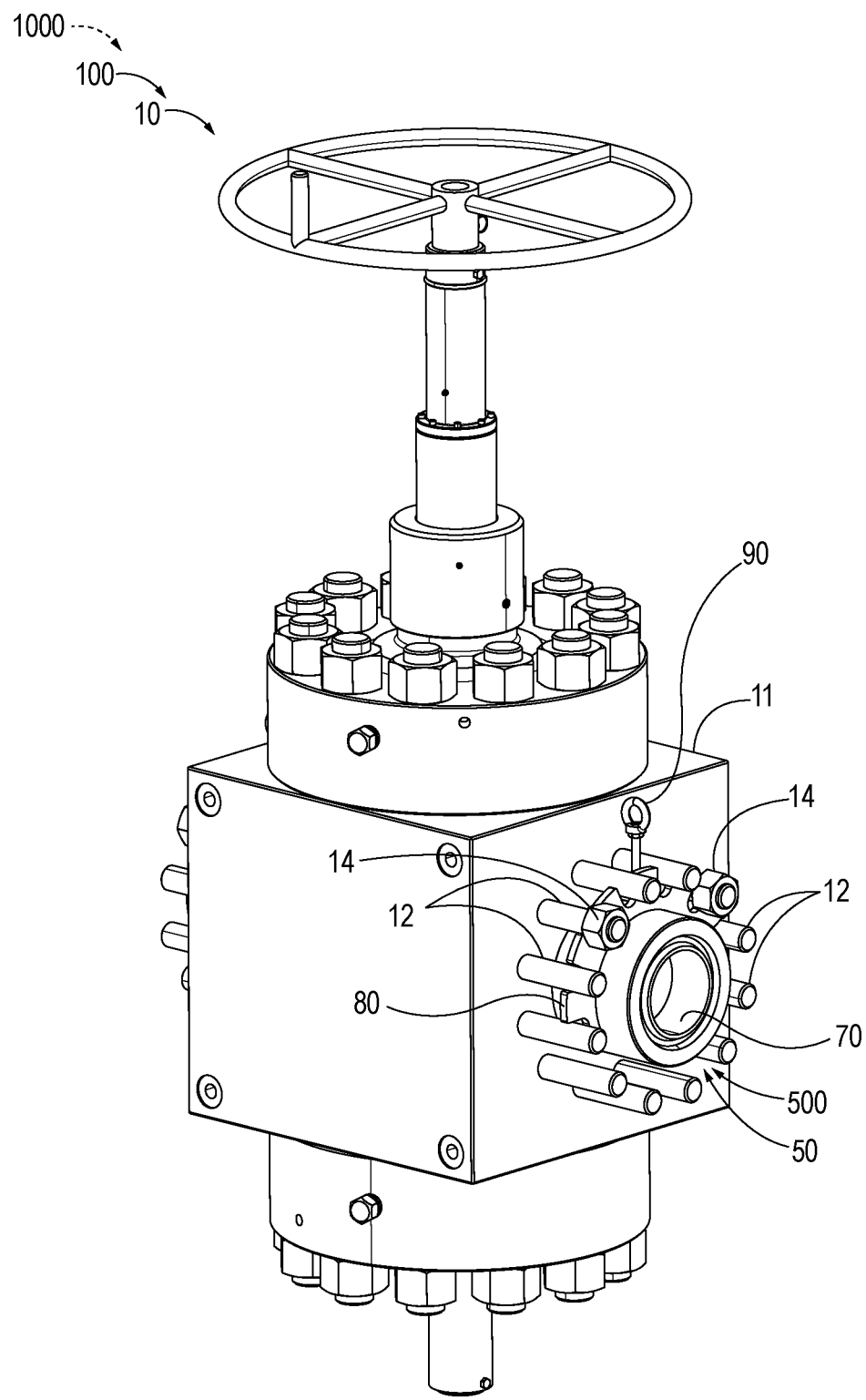
FIG. 10 is a top front side isometric view of the sealing adapter of FIGS. 5-7 supported by an example of a device under test (DUT) in the form of a studded valve, according to the present disclosure.
Figure 11:
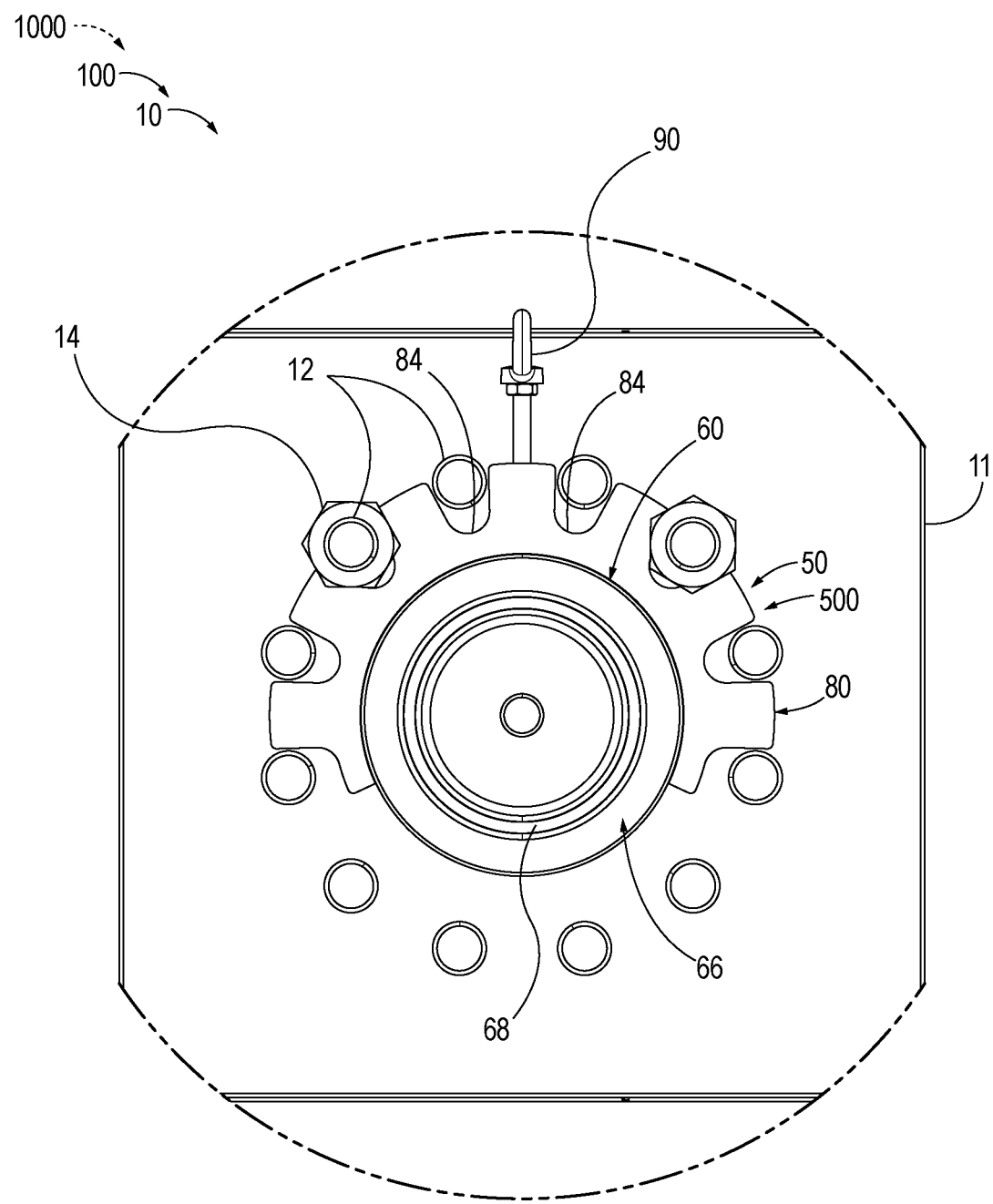
FIG. 11 is a front elevation cutaway view of the sealing adapter of FIGS. 5-7 and 10 supported by the DUT of FIG. 10.
Figure 12:
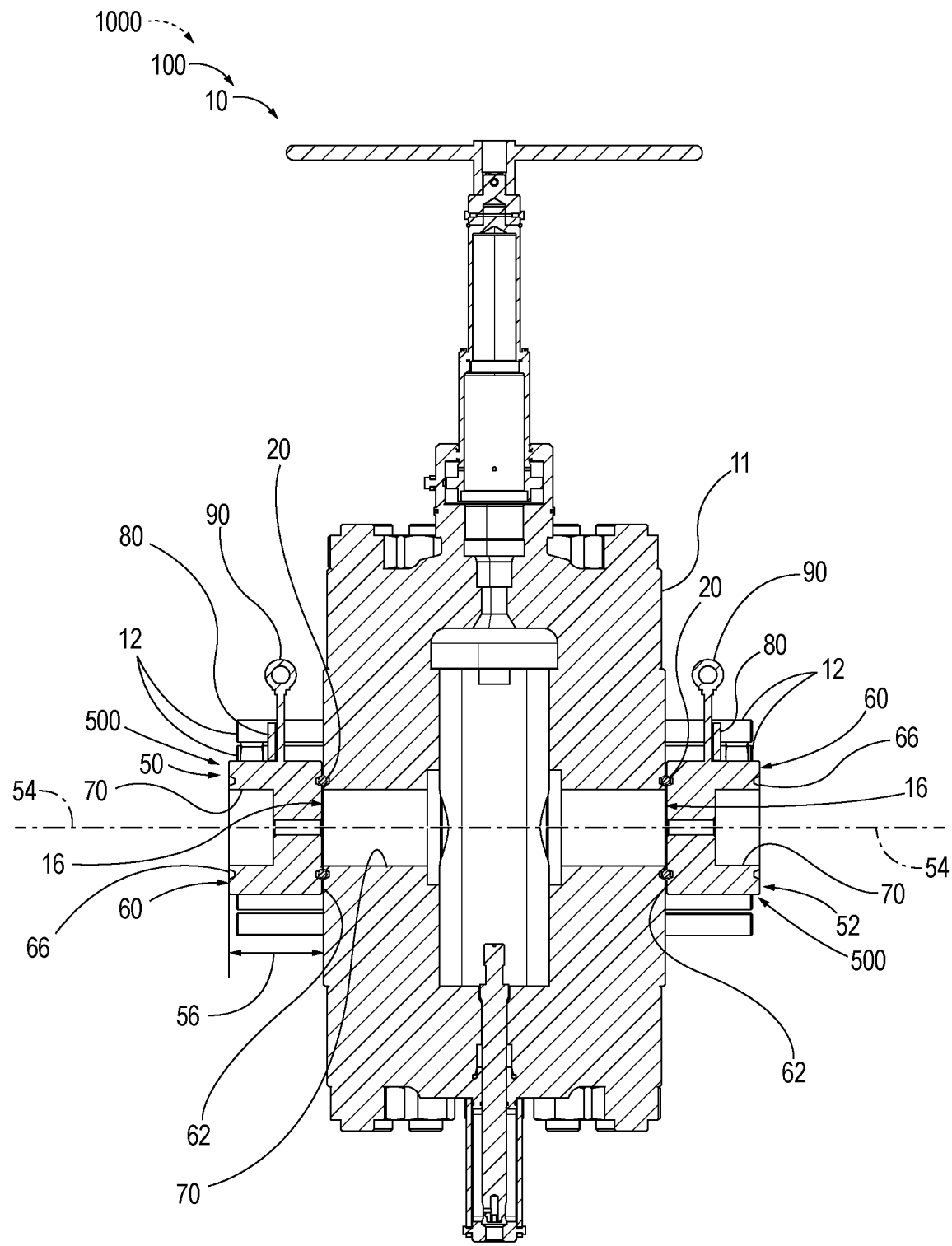
FIG. 12 is a cross-sectional side elevation view of the DUT of FIG. 10 supporting two of the sealing adapters of FIGS. 5-7 and 10-11.

FIGS. 10-12 illustrate an example in which pair of sealing adapters 50 are mounted on DUT 10 in the form of a studded valve, which is removed from a remainder of clamp structure 120. In particular, FIGS. 10-12 illustrate an example in which each of first sealing adapter 50 and second sealing adapter 52 (visible in FIG. 12) takes the form of sealing adapter 500. In this manner, FIGS. 10-12 may be described as illustrating DUT 10 and sealing adapters 500 prior to operatively coupling DUT 10 to the remainder of clamp structure 120. In this example, and as shown in FIGS. 10-12, each sealing adapter 500 is supported by engagement between mounting studs 12 of DUT 10 and stud receivers 84 of mounting flange 80, and stud retention features 14 are operatively coupled to respective mounting studs 12 to restrict sealing adapter 500 from being inadvertently removed from the DUT. As shown in FIG. 12, first sealing adapter 50 and second sealing adapter 52 are mounted relative to DUT 10 such that fluid passageway 70 of first sealing adapter 50, fluid passageway 70 of DUT 10, and fluid passageway 70 of second sealing adapter 52 are fluidly connected to one another. FIG. 12 additionally illustrates that the interface between each sealing adapter 500 (i.e., first sealing adapter 50 and second sealing adapter 52) and DUT 10 receives a respective first sealing component 20 for maintaining a fluid-tight coupling.

Figure 13:
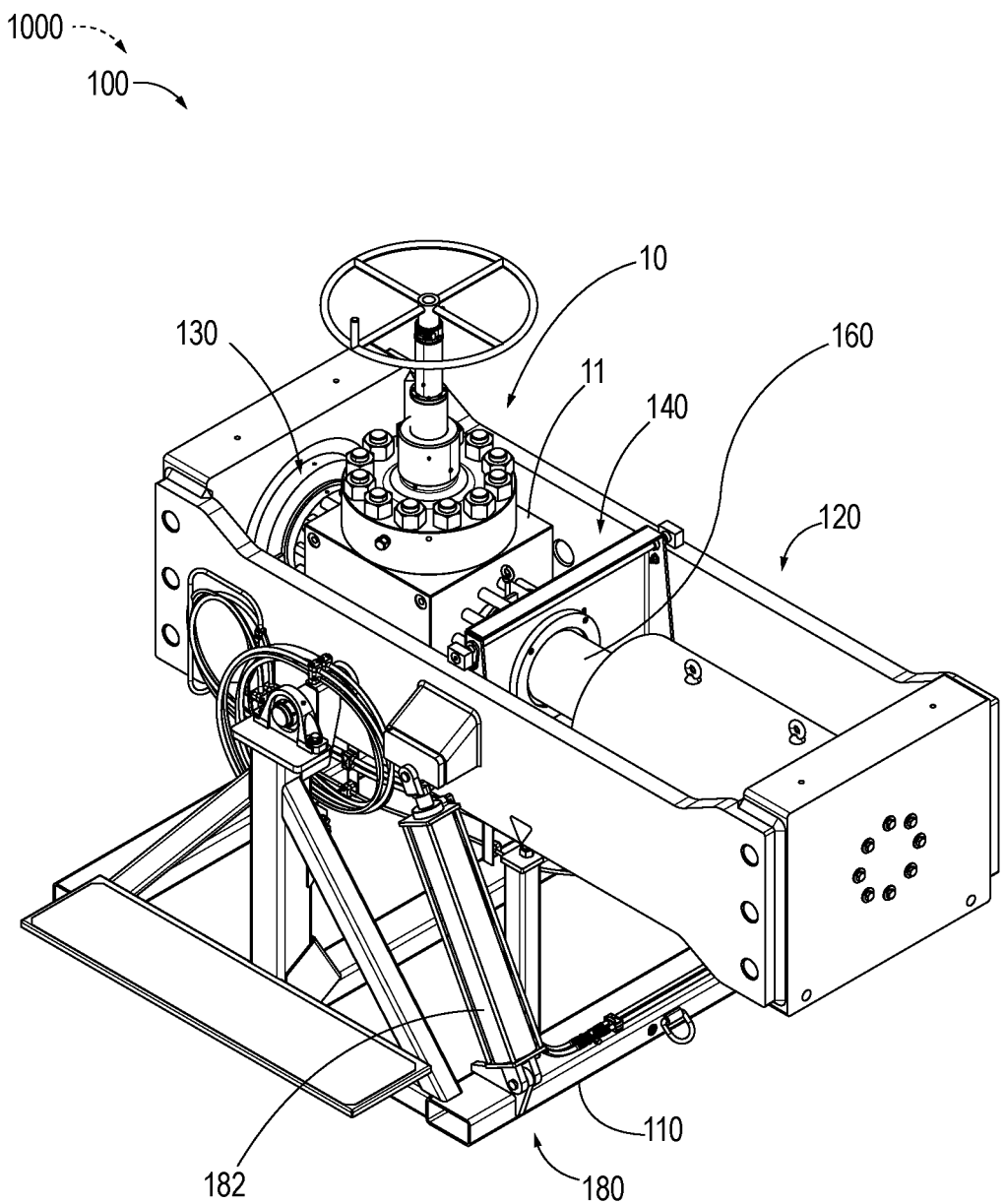
FIG. 13 is a top side isometric view illustrating an example of a DUT installed in a pressure testing system according to the present disclosure.
Figure 14:
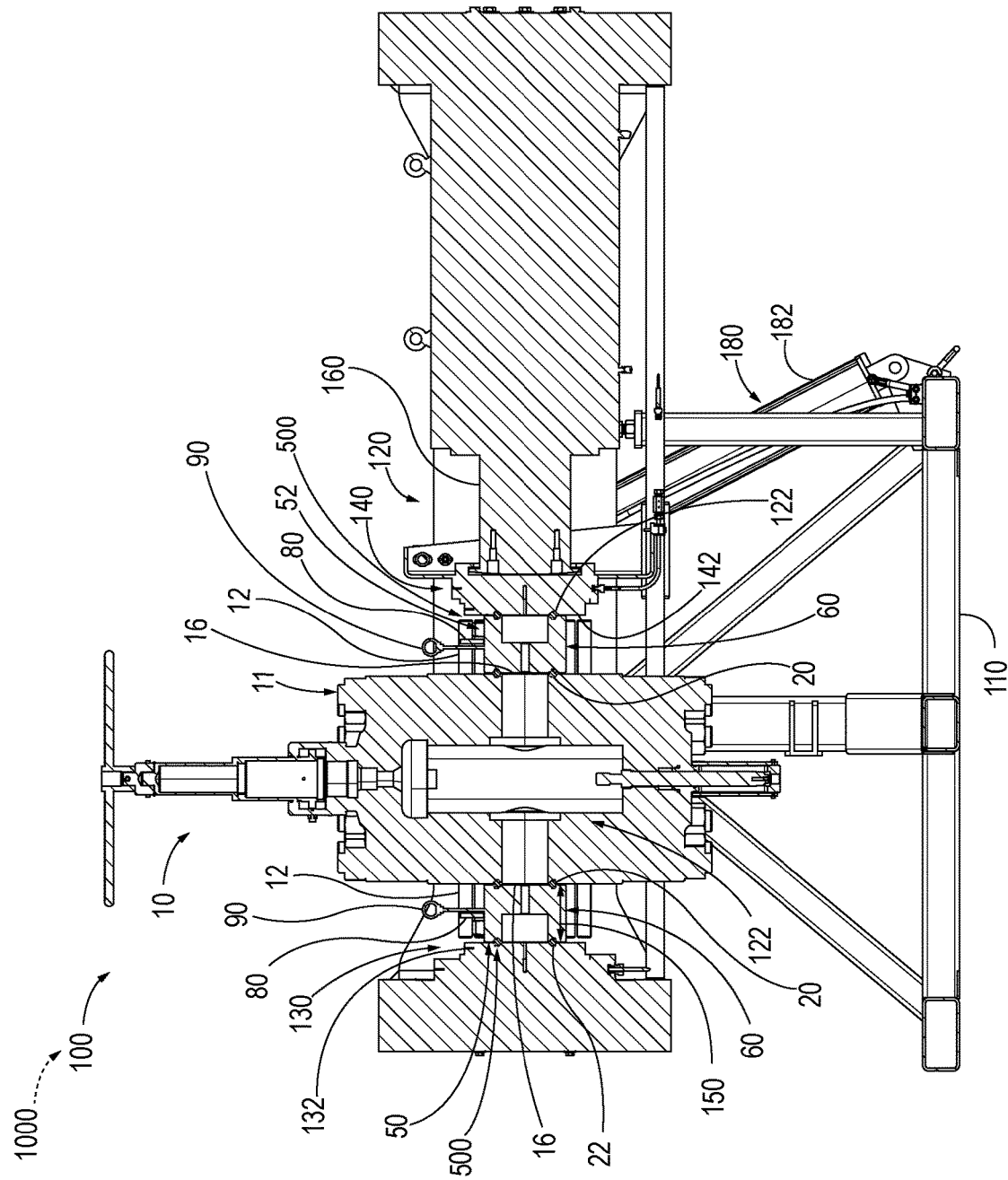
FIG. 14 is a cross-sectional side elevation view of the pressure testing system and the DUT of FIG. 13.

FIGS. 13-14 illustrate an example in which the assembly of FIGS. 10-12 (i.e., the assembly of DUT 10 supporting first sealing adapter 50 and second sealing adapter 52) is operatively coupled to a remainder of clamp structure 120 within pressure testing system 100. In particular, in this example, and as best seen in FIG. 14, first sealing adapter 50 sealingly engages first seal head 130 and second sealing adapter 52 sealingly engages second seal head 140 to form clamp structure fluid conduit 122. In this example, force transmitting member 160 takes the form of a hydraulic ram that selectively urges second seal head 140 toward first seal head 130 to ensure that clamp structure fluid conduit 122 remains fluid-tight during pressure testing of DUT 10. FIG. 14 additionally illustrates a respective second sealing component 22 positioned at the interface between first seal head 130 and first sealing adapter 50 and at the interface between second seal head 140 and second sealing adapter 52 for maintaining a fluid-tight coupling.

Figure 15:
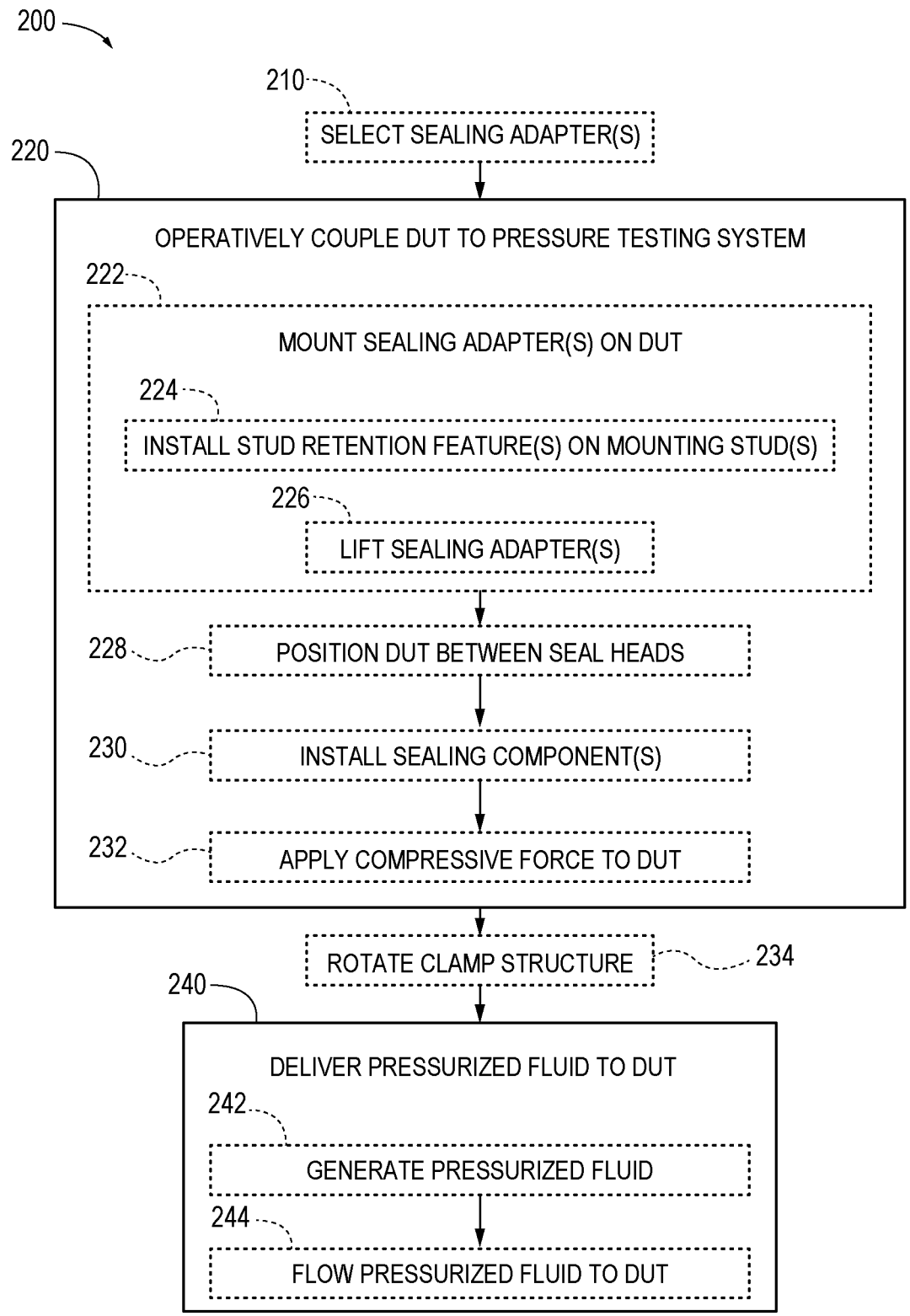
FIG. 15 is a flowchart depicting examples of methods of operating a pressure testing system according to the present disclosure.

FIG. 15 is a flowchart depicting examples of methods 200, according to the present disclosure, of utilizing a pressure testing system, such as pressure testing system 100 and/or a pressure testing system formed from pressure testing system kit 1000, to perform pressure testing of a DUT, such as DUT 10. As shown in FIG. 15, methods 200 include operatively coupling, at 220, the DUT to the pressure testing system and delivering, at 240, a pressurized fluid to the DUT. Examples of the pressurized fluid utilized in the delivering the pressurized fluid at 240 are disclosed herein with respect to pressurized fluid 172, such as may be supplied and/or generated by a pressurized fluid supply source such as pressurized fluid supply source 176 and/or may be conveyed via a pressurized fluid circuit such as pressurized fluid circuit 174. Accordingly, the operatively coupling the DUT to the pressure testing system at 220 may include forming the pressurized fluid circuit such that the pressurized fluid circuit extends at least partially through the DUT, such as through a fluid passageway of the DUT (such as fluid passageway 70 of DUT 10).

In some examples, methods 200 include utilizing at least one sealing adapter, such as at least one sealing adapter 50 as disclosed herein. In particular, and as shown in FIG. 15, methods 200 may include mounting, at 222, the sealing adapter(s) on the DUT. In some examples, the mounting the sealing adapter(s) on the DUT at 222 includes mounting each of a first sealing adapter and a second sealing adapter to the DUT. Examples of the first sealing adapter and the second sealing adapter are discussed herein in conjunction with first sealing adapter 50 and second sealing adapter 52.

In some examples, the mounting the sealing adapter(s) on the DUT at 222 includes mounting the sealing adapter on a DUT that includes a plurality of mounting studs (such as mounting studs 12 discussed herein). In such examples, the sealing adapter may include a plurality of stud receivers (such as stud receivers 84 discussed herein), such that the mounting the sealing adapter(s) on the DUT at 222 includes mounting such that each of the plurality of stud receivers receives a respective mounting stud. Stated differently, the mounting the sealing adapter(s) on the DUT at 222 may include inserting at least a subset of the mounting studs through a corresponding subset of the stud receivers. In some such examples, the mounting the sealing adapter(s) on the DUT at 222 includes mounting such that the plurality of mounting studs supports the sealing adapter. Additionally or alternatively, in some such examples, and as shown in FIG. 15, the mounting the sealing adapter(s) on the DUT at 222 includes, with the mounting studs extending through the respective stud receivers, operatively installing, at 224, one or more stud retention features (such as stud retention features 14 discussed herein) on the mounting studs such that the sealing adapter is restricted from being removed from the DUT. As a more specific example, each mounting stud may be a threaded stud and each stud retention feature may be a threaded nut such that the operatively installing the one or more stud retention features at 224 includes threading each stud retention feature onto a corresponding mounting stud. In some examples, the operatively installing the one or more stud retention features at 224 may include installing and/or threading each stud retention feature onto the corresponding mounting stud by hand (e.g., hand-tightening a threaded nut), and/or may include installing and/or threading each stud retention feature with a tool (e.g., a wrench).

In some examples, and as shown in FIG. 15, the mounting the sealing adapter(s) on the DUT at 222 includes lifting, at 226, the sealing adapter, such as via a lifting member of the sealing adapter (such as lifting member 90 discussed herein) in order to position the sealing adapter relative to the DUT. In such examples, the lifting the sealing adapter at 226 may include lifting the sealing adapter from a position beneath the DUT to raise the sealing adapter to the level of the DUT, and/or may include supporting and/or maneuvering the sealing adapter to bring the sealing adapter toward and/or to the DUT in order to support the sealing adapter upon the mounting studs of the DUT. Additionally or alternatively, the lifting the sealing adapter at 226 may include aligning the sealing adapter with the DUT such that the fluid passageway of the sealing adapter is at least substantially aligned with the fluid passageway of the DUT.

In some examples, and as shown in FIG. 15, methods 200 include, prior to the operatively coupling the DUT to the pressure testing system at 220, selecting, at 210, the one or more sealing adapters from among a plurality of sealing adapters. For example, and as discussed, the pressure testing system may correspond to, and/or be assembled from, a pressure testing system kit, such as a kit that is configured to enable the pressure testing system to be utilized to test a variety of distinct DUTs. Accordingly, in such examples, the pressure testing kit may include a plurality of sealing adapters with correspondingly distinct structural and/or functional properties, such as may be configured for pressure testing of DUTs of various sizes, DUTs with mounting studs exhibiting various lengths and/or bolt circle radii, DUTs rated to distinct pressure ratings, etc. Accordingly, the selecting the sealing adapter(s) at 210 may include selecting such that a size of the sealing adapter(s) (e.g., adapter length 56 and/or a diameter of adapter body 60) corresponds to a size of the DUT (e.g., a length of each mounting stud and/or a diameter of a fluid opening of the DUT, such as fluid opening 16 as discussed herein). Additionally or alternatively, the selecting the sealing adapter(s) at 210 may include selecting such that each of a first sealing surface and/or a second sealing surface (such as first sealing surface 64 and/or second sealing surface 68 as discussed herein) is configured to receive and/or engage a respective sealing component (such as first sealing component 20 and/or second sealing component 22 as discussed herein) that corresponds to a pressure rating of the DUT. As another example, the selecting the sealing adapter(s) at 210 may include selecting such that a stud receiver radius of each stud receiver (e.g., stud receiver radius 86 as discussed herein) is at least substantially equal to a bolt circle radius corresponding to the mounting studs of the DUT. As another example, the selecting the sealing adapter(s) at 210 may include selecting such that a minimum notch radius of the mounting flange (e.g., minimum notch radius 88 as described herein) is smaller than a bolt circle radius corresponding to the mounting studs of the DUT.

In some examples, the operatively coupling the DUT to the pressure testing system at 220 includes one or more steps for clamping the DUT within a portion of the pressure testing system. For example, and as shown in FIG. 15, the operatively coupling the DUT to the pressure testing system at 220 may include positioning, at 228, the DUT between a first seal head and a second seal head of a clamp structure of the pressure testing system, such as first seal head 130 and/or second seal head 140 of clamp structure 120 as discussed herein. In such examples, the operatively coupling the DUT to the pressure testing system at 220 further may include, subsequent to the positioning the DUT between the first seal head and the second seal head at 228, applying, at 232, a compressive force to the DUT with a force transmitting member (such as force transmitting member 160 as discussed herein) to form a clamp structure fluid conduit (such as clamp structure fluid conduit 122 as discussed herein). More specifically, the applying the compressive force at 232 may include applying sufficient compressive force to ensure that the clamp structure fluid conduit is fluid-tight during the delivering the pressurized fluid to the DUT at 240, discussed in more detail below. In some examples, the positioning the DUT between the first seal head and the second seal head at 228 is performed subsequent to the mounting the at least one sealing adapter(s) on the DUT at 222. Additionally or alternatively, and as shown in FIG. 15, the operatively coupling the DUT to the pressure testing system at 220 further may include, prior to the applying the compressive force at 232, installing, at 230, one or more sealing components, such as first sealing component 20 and/or second sealing component 22 as discussed herein. In such examples, the installing the sealing component(s) at 230 may include installing the first sealing component and the second sealing component to each sealing adapter. In such examples, the installing the sealing component(s) at 230 may be performed prior to the mounting the sealing adapter(s) on the DUT at 222, subsequent to the mounting the sealing adapter(s) on the DUT at 222, prior to the positioning the DUT between the seal heads at 228, and/or subsequent to the positioning the DUT between the seal heads at 228.

In some examples, and as shown in FIG. 15, methods 200 additionally include, subsequent to the operatively coupling the DUT to the pressure testing system at 220, rotating, at 234, the clamp structure relative to a frame of the pressure testing system (such as frame 110 as discussed herein), such as with a DUT rotation mechanism such as DUT rotation mechanism 180 as discussed herein. In such examples, the rotating the clamp structure at 234 may be performed prior to the delivering the pressurized fluid to the DUT to 240. The rotating the clamp structure relative to the frame at 234 may include rotating the clamp structure through any of various angles, such as any DUT rotation angle 184 as discussed herein.

The delivering the pressurized fluid to the DUT at 240 may be performed in various suitable manners. In some examples, and as shown in FIG. 15, the delivering the pressurized fluid to the DUT at 240 includes generating, at 242, the pressurized fluid with a pressurized fluid source (such as pressurized fluid supply source 176 as discussed herein) and flowing, at 244, the pressurized fluid to the DUT via a pressurized fluid circuit (such as pressurized fluid circuit 174 as discussed herein). The pressurized fluid may include and/or be any of various pressurized fluids, such as pressurized fluid 172 as discussed herein. The generating the pressurized fluid at 242 additionally or alternatively may be referred to as pressurizing the pressurized fluid. In this manner, as used herein, the generating the pressurized fluid at 242 is intended to refer to any steps or processes for producing the pressurized fluid, for pressurizing the pressurized fluid, for generating pressure in the pressurized fluid, for generating a flow of the pressurized fluid, etc., and may describe steps or processes that utilize a preexisting pressurized fluid. As examples, the generating the pressurized fluid at 242 may include pressurizing the pressurized fluid to a fluid pressure that is at least 5 bar, at least 10 bar, at least 30 bar, at least 100 bar, at least 300 bar, at least 500 bar, at least 1,000 bar, at most 1,500 bar, at most 700 bar, at most 200 bar, at most 70 bar, at most 20 bar, and/or at most 7 bar.

Illustrative, non-exclusive examples of sealing adapters, pressure testing systems, pressure testing system kits, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A sealing adapter for fluidly coupling a device under test (DUT), which includes a DUT body and a plurality of mounting studs extending from the DUT body, to a corresponding seal head of a pressure testing system, the sealing adapter comprising:

an adapter body that includes a first end with a first sealing surface, a second end, and a fluid passageway, wherein the first end and the second end are spaced apart from one another along an adapter axis of the sealing adapter; and a mounting flange extending radially away from the adapter body and defining a plurality of stud receivers;

wherein the sealing adapter is configured such that, during operative use of the sealing adapter, the sealing adapter is positioned between the DUT and the corresponding seal head such that each stud receiver of the plurality of stud receivers receives a respective mounting stud of the plurality of mounting studs.

A2. The sealing adapter of paragraph A1, wherein the second end includes a second sealing surface.

A3. The sealing adapter of any of paragraphs A1-A2, wherein the fluid passageway fluidly interconnects the first end and the second end.

A4. The sealing adapter of any of paragraphs A1-A3, wherein the adapter body additionally includes an exterior surface extending between the first end and the second end; and wherein the fluid passageway extends between the first end and an opening defined on the exterior surface of the adapter body between the first end and the second end.

A5. The sealing adapter of any of paragraphs A1-A4, wherein the DUT includes, and optionally is, one or more of a valve, a straight pattern ball valve, a globe valve, a gate valve, a butterfly valve, and a check valve.

A6. The sealing adapter of any of paragraphs A1-A5, wherein the mounting flange extends at least substantially perpendicular to the adapter axis.

A7. The sealing adapter of any of paragraphs A1-A6, wherein the sealing adapter has an adapter length, as measured between the first end and the second end along a direction parallel to the adapter axis, that is one or more of at least 10 centimeters (cm), at least 30 cm, at least 50 cm, at least 100 cm, at most 150 cm, at most 70 cm, and at most 20 cm.

A8. The sealing adapter of paragraph A7, wherein the adapter length is greater than a length of each mounting stud of the plurality of mounting studs.

A9. The sealing adapter of any of paragraphs A1-A8, wherein the mounting flange is configured to engage the plurality of mounting studs of the DUT such that the sealing adapter is at least partially supported, and optionally fully supported, by the DUT during operative use of the sealing adapter.

A10. The sealing adapter of paragraph A9, wherein the mounting flange is configured such that, when each stud receiver of the plurality of stud receivers receives the respective mounting stud of the plurality of mounting studs, the plurality of mounting studs at least partially supports, and optionally fully supports, the sealing adapter.

A11. The sealing adapter of any of paragraphs A1-A10, wherein the mounting flange extends at least substantially, and optionally fully, circumferentially around the adapter body.

A12. The sealing adapter of any of paragraphs A1-A10, wherein the mounting flange extends only partially circumferentially around the adapter body.

A13. The sealing adapter of any of paragraphs A1-A12, wherein the mounting flange extends circumferentially around the adapter body with an angular extent that is one or more of at least 120 degrees, at least 150 degrees, at least 180 degrees, at least 210 degrees, at least 240 degrees, at least 270 degrees, at least 300 degrees, at least 330 degrees, at most 360 degrees, at most 315 degrees, at most 285 degrees, at most 255 degrees, at most 225 degrees, at most 195 degrees, at most 165 degrees, and at most 135 degrees.

A14. The sealing adapter of any of paragraphs A1-A13, wherein each stud receiver of the plurality of stud receivers is one or more of an aperture formed in the mounting flange, a notch formed in a peripheral region of the mounting flange, a cutout defined in the peripheral region of the mounting flange, a recess formed in the peripheral region of the mounting flange, a channel formed in the peripheral region of the mounting flange, and a groove formed in the peripheral region of the mounting flange.

A15. The sealing adapter of paragraph A14, wherein the mounting flange has a maximum mounting flange radius, as measured from a/the adapter axis and along a direction perpendicular to the adapter axis; and wherein each stud receiver of the plurality of stud receivers is the aperture formed in the mounting flange; wherein each aperture is centered at a location that is spaced apart from the adapter axis by a stud receiver radius.

A16. The sealing adapter of paragraph A15, wherein the stud receiver radius is one or more of at least 5 cm, at least 10 cm, at least 20 cm, at least 30 cm, at least 50 cm, at least 100 cm, at least 150 cm, at most 200 cm, at most 120 cm, at most 70 cm, at most 40 cm, at most 25 cm, at most 15 cm, and at most 7 cm.

A17. The sealing adapter of any of paragraphs A15-A16, wherein a ratio of the stud receiver radius to the maximum mounting flange radius is one or more of at least 0.2:1, at least 0.5:1, at least 0.7:1, at most 0.95:1, at most 0.6:1, and at most 0.3:1.

A18. The sealing adapter of any of paragraphs A14-A17, wherein each stud receiver of the plurality of stud receivers is the notch formed in the peripheral region of the mounting flange that extends to a point that is spaced apart from the adapter axis by a minimum notch radius.

A19. The sealing adapter of paragraph A18, wherein the minimum notch radius is one or more of at least 5 cm, at least 10 cm, at least 20 cm, at least 30 cm, at least 50 cm, at least 100 cm, at least 150 cm, at most 200 cm, at most 120 cm, at most 70 cm, at most 40 cm, at most 25 cm, at most 15 cm, and at most 7 cm.

A20. The sealing adapter of any of paragraphs A18-A19, wherein a ratio of the minimum notch radius to a/the maximum mounting flange radius is one or more of at least 0.2:1, at least 0.5:1, at least 0.7:1, at most 0.95:1, at most 0.6:1, and at most 0.3:1.

A21. The sealing adapter of any of paragraphs A1-A20, wherein the plurality of stud receivers includes at least 4 stud receivers, at least 6 stud receivers, at least 10 stud receivers, at least 15 stud receivers, at most 20 stud receivers, at most 13 stud receivers, at most 8 stud receivers, and at most 5 stud receivers.

A22. The sealing adapter of any of paragraphs A1-A21, wherein one or both of the first end and the second end is one or both of at least substantially flat and at least substantially planar.

A23. The sealing adapter of paragraph A22, wherein one or both of the first end and the second end extends at least substantially perpendicular to the adapter axis.

A24. The sealing adapter of any of paragraphs A22-A23, wherein the first end and the second end extend at least substantially parallel to one another.

A25. The sealing adapter of any of paragraphs A1-A24, wherein the first sealing surface is configured to receive and/or engage a first sealing component to form a fluid seal between the first sealing surface and a fluid opening of the DUT during operative use of the sealing adapter.

A26. The sealing adapter of any of paragraphs A2-A25, wherein the second sealing surface is configured to receive and/or engage a second sealing component to form a fluid seal between the second sealing surface and the corresponding seal head during operative use of the sealing adapter.

A27. The sealing adapter of any of paragraphs A1-A26, wherein one or both of a/the first sealing component and a/the second sealing component includes, and optionally is, one or more of a sealing gasket, a ring type joint (RTJ) gasket, an O-ring, a sealing surface, and a polyurethane sealing surface.

A28. The sealing adapter of any of paragraphs A1-A27, wherein the fluid passageway of the sealing adapter defines one or both of:

(i) a first passageway chamber proximate to the first end of the sealing adapter and with a first passageway diameter, as measured along a direction perpendicular to the adapter axis; and (ii) a second passageway chamber proximate to the second end of the sealing adapter and with a second passageway diameter, as measured along a direction perpendicular to the adapter axis, that is different than the first passageway diameter.

A29. The sealing adapter of paragraph A28, wherein the second passageway diameter is greater than the first passageway diameter.

A30. The sealing adapter of paragraph A28, wherein the first passageway chamber extends from the first end of the sealing adapter to the second end of the sealing adapter, and wherein the first passageway diameter is at least substantially constant across a length of the sealing adapter.

A31. The sealing adapter of any of paragraphs A28-A29, wherein one or both of the first passageway chamber and the second passageway chamber is at least substantially cylindrical.

A32. The sealing adapter of any of paragraphs A28-A29 or A31, wherein the fluid passageway of the sealing adapter defines a shoulder that extends between the first passageway chamber and the second passageway chamber, optionally that extends at least substantially perpendicular to the adapter axis.

A33. The sealing adapter of any of paragraphs A1-A32, further comprising a lifting member configured to be engaged by a lifting apparatus to lift the sealing adapter.

A34. The sealing adapter of paragraph A33, wherein the lifting member comprises one or more of a hook, a ring, a shackle, and a chain link.

A35. The sealing adapter of any of paragraphs A33-A34, wherein the adapter body includes and/or defines the lifting member.

A36. The sealing adapter of any of paragraphs A33-A35, wherein the mounting flange includes and/or defines the lifting member.

A37. The sealing adapter of any of paragraphs A33-A36, wherein the lifting member extends away from the adapter body.

A38. The sealing adapter of any of paragraphs A33-A37, wherein the lifting member is at least substantially aligned with a center of mass of the sealing adapter.

B1. A pressure testing system for performing pressure testing of a DUT, the pressure testing system comprising:
a frame;
a clamp structure supported by the frame and configured to operatively support the DUT; and
a pressurizing assembly for delivering a pressurized fluid to the DUT;
wherein the clamp structure includes at least one of the sealing adapter of any of paragraphs A1-A38.

B2. The pressure testing system of paragraph B1, wherein the clamp structure includes:
a first seal head;
a second seal head spaced apart from the first seal head; and
a force transmitting member configured to force the DUT into sealing engagement with at least a portion of the clamp structure when the DUT is positioned between the first seal head and the second seal head;
wherein each sealing adapter of the at least one sealing adapter is configured to be positioned between the DUT and one of the first seal head and the second seal head during operative use of the pressure testing system.

B3. The pressure testing system of paragraph B2, wherein the at least one sealing adapter is configured to space the DUT apart from one or both of the first seal head and the second seal head by an adapter spacing distance during operative use of the pressure testing system.

B4. The pressure testing system of paragraph B3, wherein the adapter spacing distance is one or more of at least 10 cm, at least 30 cm, at least 50 cm, at least 100 cm, at most 150 cm, at most 70 cm, and a most 20 cm.

B5. The pressure testing system of any of paragraphs B3-B4, wherein the adapter spacing distance is at least substantially equal to a/the adapter length.

B6. The pressure testing system of any of paragraphs B3-B5, wherein the pressure testing system is configured to be utilized to test a DUT that includes a/the plurality of mounting studs; and wherein the pressure testing system is configured such that the adapter spacing distance is greater than a length of each mounting stud of the plurality of mounting studs.

B7. The pressure testing system of any of paragraphs B2-B6, wherein the at least one sealing adapter includes one or both of:
(i) a first sealing adapter configured to be positioned between the first seal head and the DUT during operative use of the pressure testing system; and
(ii) a second sealing adapter configured to be positioned between the second seal head and the DUT during operative use of the pressure testing system.

B8. The pressure testing system of any of paragraphs B2-B7, wherein the first seal head includes a first seal plate that is configured to sealingly engage one or both of a/the first sealing adapter and the DUT during operative use of the pressure testing system.

B9. The pressure testing system of paragraph B8, wherein the first seal plate is configured to be selectively and repeatedly removed from and assembled onto a remainder of the first seal head without damage to the first seal head.

B10. The pressure testing system of paragraph B9, wherein the first seal head includes a first seal plate cradle that is configured to receive and support the first seal plate when the first seal plate is operatively installed in the first seal head.

B11. The pressure testing system of any of paragraphs B2-B10, wherein the second seal head includes a second seal plate that is configured to sealingly engage one or both of a/the second sealing adapter and the DUT during operative use of the pressure testing system.

B12. The pressure testing system of paragraph B11, wherein the second seal plate is configured to be selectively and repeatedly removed from and assembled onto a remainder of the second seal head without damage to the second seal head.

B13. The pressure testing system of paragraph B12, wherein the second seal head includes a second seal plate cradle that is configured to receive and support the second seal plate when the second seal plate is operatively installed in the second seal head.

B14. The pressure testing system of any of paragraphs B7-B13, wherein one or both of:
(i) the first sealing adapter is permanently coupled to one or both of the first seal head and a/the first seal plate; and
(ii) the second sealing adapter is permanently coupled to one or both of the second seal head and a/the second seal plate.

B15. The pressure testing system of any of paragraphs B2-B14, wherein the force transmitting member includes one or more of a lead screw, a hydraulic ram, and a hydraulic cylinder.

B16. The pressure testing system of any of paragraphs B2-B15, wherein the force transmitting member is configured to selectively translate one of the first seal head and the second seal head toward the other of the first seal head and the second seal head.

B17. The pressure testing system of any of paragraphs B2-B16, wherein the force transmitting member is configured to apply a compressive force to the DUT that is sufficient to form a fluid seal between the DUT and the clamp structure that restricts leakage of the pressurized fluid during operative use of the pressure testing system.

B18. The pressure testing system of any of paragraphs B2-B17, wherein the force transmitting member is configured to apply a/the compressive force to the DUT with a magnitude that is sufficient to support and maintain the DUT in position relative to the clamp structure during operative use of the pressure testing system.

B19. The pressure testing system of any of paragraphs B2-B18, wherein the force transmitting member is configured to apply a/the compressive force with a magnitude that is one or more of at least 500 kiloNewtons (kN), at least 1,000 kN, at least 1,500 kN, at least 2,000 kN, at least 2,500 kN at least 3,000 kN, at most 3,500 kN, at most 2,700 kN, at most 2,200 kN, at most 1,700 kN, at most 1,200 kN, and at most 700 kN.

B20. The pressure testing system of any of paragraphs B1-B19, further comprising a DUT rotation mechanism for selectively rotating the clamp structure relative to the frame during operative use of the pressure testing system.

B21. The pressure testing system of paragraph B20, wherein the DUT rotation mechanism includes at least one lifting hydraulic cylinder that is operatively coupled to each of the frame and the clamp structure.

B22. The pressure testing system of any of paragraphs B20-B21, wherein the DUT rotation mechanism is configured to selectively rotate the clamp structure relative to the frame through a DUT rotation angle that is one or more of at least 10 degrees, at least 30 degrees, at least 45 degrees, at least 60 degrees, at least 75 degrees, at most 90 degrees, at most 65 degrees, at most 50 degrees, at most 35 degrees, and at most 20 degrees.

B23. The pressure testing system of any of paragraphs B1-B22, wherein the pressurizing assembly includes:
a pressurized fluid circuit through which the pressurized fluid flows during operative use of the pressure testing system; and
a pressurized fluid supply source configured to pressurize the pressurized fluid and to flow the pressurized fluid through the pressurized fluid circuit.

B24. The pressure testing system of paragraph B23, wherein the pressurized fluid circuit includes one or more of:
(i) one or more pressurized fluid supply lines fluidly coupled to the pressurized fluid supply source; and
(ii) a clamp structure fluid conduit formed by one or more of a/the first seal head, a/the first seal plate, a/the first sealing adapter, the DUT, a/the second sealing adapter, a/the second seal plate, and a/the second seal head.

B25. The pressure testing system of paragraph B24, wherein one or more of the first seal head, the first seal plate, the first sealing adapter, the DUT, the second sealing adapter, the second seal plate, and the second seal head includes a respective fluid passageway configured to support a flow of the pressurized fluid; and wherein the clamp structure fluid conduit includes the respective fluid passageway of each of the one or more of the first seal head, the first seal plate, the first sealing adapter, the DUT, the second sealing adapter, the second seal plate, and the second seal head.

B26. The pressure testing system of any of paragraphs B24-B25, wherein one or both of the first seal head and the second seal head defines an internal passage through which at least a portion of a respective pressurized fluid supply line extends; and wherein the clamp structure fluid conduit includes the portion of the respective pressurized fluid supply line extending within the clamp structure.

B27. The pressure testing system of any of paragraphs B24-B26, wherein the clamp structure fluid conduit is a fluid-tight fluid conduit that extends between and includes the first sealing adapter and the second sealing adapter, optionally that extends between and includes the first seal head and the second seal head.

B28. The pressure testing system of any of paragraphs B23-B27, wherein the pressure testing system is configured such that at least one of the one or more pressurized fluid supply lines is directly connected to a corresponding sealing adapter of the first sealing adapter and the second sealing adapter during operative use of the pressure testing system.

B29. The pressure testing system of paragraph B28, when dependent from paragraph B26, wherein the at least one of the one or more pressurized fluid supply lines is configured to extend at least partially through a corresponding seal head of the first seal head and the second seal head and to connect directly to the second end of the corresponding sealing adapter during operative use of the pressure testing system.

B30. The pressure testing system of any of paragraphs B28-B29, when dependent from paragraph A4, wherein the at least one of the one or more pressurized fluid supply lines is configured to be directly connected to the exterior surface of the adapter body of the corresponding sealing adapter during operative use of the pressure testing system.

B31. The pressure testing system of any of paragraphs B1-B30, wherein the pressurized fluid includes one or more of a fluid, a gas, air, nitrogen, a liquid, glycol, water, and an oil.

B32. The pressure testing system of any of paragraphs B23-6231, wherein the pressurized fluid supply source is configured to pressurize the pressurized fluid to a fluid pressure that is one or more of at least 5 bar, at least 10 bar, at least 30 bar, at least 100 bar, at least 300 bar, at least 500 bar, at least 1,000 bar, at most 1,500 bar, at most 700 bar, at most 200 bar, at most 70 bar, at most 20 bar, and at most 7 bar.

B33. The pressure testing system of any of paragraphs B1-B32, further comprising a testing system controller configured to at least partially control the operation of one or more components of the pressure testing system.

B34. The pressure testing system of paragraph B33, wherein the testing system controller is configured to at least partially regulate a/the magnitude of a/the compressive force exerted by the force transmitting member.

B35. The pressure testing system of any of paragraphs B33-B34, wherein the testing system controller is configured to at least partially regulate a/the fluid pressure of the pressurized fluid.

B36. The pressure testing system of any of paragraphs B33-B35, wherein the testing system controller is configured to at least partially regulate a/the DUT rotation angle.

B37. The pressure testing system of any of paragraphs B33-B36, wherein the testing system controller is configured to operate at least partially automatically.

B38. The pressure testing system of any of paragraphs B33-B37, wherein the testing system controller is configured to operate at least partially responsive to a user input.

C1. A pressure testing system kit for performing pressure testing of a DUT, the pressure testing system kit comprising:
a frame;
a clamp structure operatively coupled to the frame and configured to operatively support the DUT; and
a pressurizing assembly for delivering a pressurized fluid to the DUT;
wherein the clamp structure includes a plurality of sealing adapters; wherein each sealing adapter of the plurality of sealing adapters is the sealing adapter of any of paragraphs A1-A38.

C2. The pressure testing system kit of paragraph C1, wherein the frame is the frame of any of paragraphs B1-B33.

C3. The pressure testing system kit of any of paragraphs C1-C2, wherein the clamp structure is the clamp structure of any of paragraphs B1-1338.

C4. The pressure testing system kit of any of paragraphs C1-C3, wherein the pressurizing assembly is the pressurizing assembly of any of paragraphs B1-1338.

C5. The pressure testing system kit of any of paragraphs C1-C4, wherein the plurality of sealing adapters includes at least a first sealing adapter and a second sealing adapter; and wherein one or more of:
(i) a/the adapter length of the first sealing adapter is different than the adapter length of the second sealing adapter;
(ii) a/the maximum mounting flange radius of the first sealing adapter is different than the maximum mounting flange radius of the second sealing adapter;
a/the stud receiver radius of the first sealing adapter is different than the stud receiver radius of the second sealing adapter;

(iv) a/the minimum notch radius of the first sealing adapter is different than the minimum notch radius of the second sealing adapter;

(v) the first sealing adapter and the second sealing adapter are configured to be utilized with distinct sealing components; and (vi) the first sealing adapter and the second sealing adapter are rated to distinct maximum pressures.

D1. A method of pressure testing a DUT with the pressure testing system of any of paragraphs B1-B38, the method comprising:

operatively coupling the DUT to the pressure testing system; and delivering the pressurized fluid to the DUT.

D2. The method of paragraph D1, wherein the operatively coupling the DUT to the pressure testing system forms a/the pressurized fluid circuit that extends at least partially through the DUT, optionally through a/the respective fluid passageway of the DUT.

D3. The method of any of paragraphs D1-D2, wherein the operatively coupling the DUT to the pressure testing system includes mounting the at least one sealing adapter on the DUT.

D4. The method of paragraph D3, wherein the DUT includes a/the plurality of mounting studs; and wherein the mounting the at least one sealing adapter on the DUT includes mounting such that each of the plurality of stud receivers receives a/the respective mounting stud of the plurality of mounting studs.

D5. The method of any of paragraphs D3-D4, wherein the mounting the at least one sealing adapter on the DUT includes mounting such that the plurality of mounting studs supports the at least one sealing adapter.

D6. The method of any of paragraphs D3-D5, wherein the DUT further includes one or more stud retention features configured to be operatively installed on the plurality of mounting studs; and wherein the mounting the at least one sealing adapter on the DUT includes, with each of the plurality of stud receivers receiving the respective mounting stud, operatively installing the one or more stud retention features on the plurality of mounting studs such that the at least one sealing adapter is restricted from being removed from the DUT.

D7. The method of paragraph D6, wherein each mounting stud of the plurality of mounting studs is a threaded stud; wherein each stud retention feature of the one or more stud retention features is a threaded nut; and wherein the operatively installing the one or more stud retention features includes threading each stud retention feature of the one or more stud retention features onto a corresponding mounting stud of the plurality of mounting studs.

D8. The method of any of paragraphs D3-D7, wherein the mounting the at least one sealing adapter on the DUT includes lifting the at least one sealing adapter, optionally via a/the lifting member of the at least one sealing adapter, to position the at least one sealing adapter relative to the DUT.

D9. The method of paragraph D8, wherein the lifting the at least one sealing adapter includes aligning the at least one sealing adapter with the DUT such that a/the respective fluid passageway of the at least one sealing adapter is at least substantially aligned with a/the respective fluid passageway of the DUT.

D10. The method of any of paragraphs D1-D9, wherein the operatively coupling the DUT to the pressure testing system includes:

positioning the DUT between a/the first seal head and a/the second seal head of the clamp structure; and subsequent to the positioning the DUT between the first seal head and the second seal head, applying a/the compressive force to the DUT with a/the force transmitting member to form a/the clamp structure fluid conduit.

D11. The method of paragraph D10, when dependent from paragraph D3, wherein the positioning the DUT between the first seal head and the second seal head is performed subsequent to the mounting the at least one sealing adapter on the DUT.

D12. The method of any of paragraphs D10-D11, wherein the applying the compressive force includes applying sufficient compressive force that the clamp structure fluid conduit is fluid-tight.

D13. The method of any of paragraphs D10-D12, wherein the operatively coupling the DUT to the pressure testing system further includes, prior to the applying the compressive force, and for each sealing adapter of the at least one sealing adapter, installing one or both of a/the first sealing component and a/the second sealing component.

D14. The method of any of paragraphs D1-D13, wherein the delivering the pressurized fluid to the DUT includes:

generating the pressurized fluid with a/the pressurized fluid source; and flowing the pressurized fluid to the DUT via a/the pressurized fluid conduit.

D15. The method of paragraph D14, wherein the generating the pressurized fluid includes pressurizing the pressurized fluid to a/the fluid pressure that is one or more of at least 5 bar, at least 10 bar, at least 30 bar, at least 100 bar, at least 300 bar, at least 500 bar, at least 1,000 bar, at most 1,500 bar, at most 700 bar, at most 200 bar, at most 70 bar, at most 20 bar, and at most 7 bar.

D16. The method of any of paragraphs D1-D15, further comprising, subsequent to the operatively coupling the DUT to the pressure testing system, rotating the clamp structure relative to the frame, optionally with a/the DUT rotation mechanism, optionally through a/the DUT rotation angle.

D17. The method of paragraph D16, wherein the rotating the clamp structure relative to the frame is performed prior to the delivering the pressurized fluid to the DUT.

D18. The method of any of paragraphs D1-D17, further comprising, prior to the operatively coupling the DUT to the pressure testing system, selecting the one or more sealing adapters from among a plurality of sealing adapters based, at least in part, on one or more properties of the DUT.

D19. The method of paragraph D18, wherein the selecting the one or more sealing adapters includes selecting such that a size of the one or more sealing adapters corresponds to a size of the DUT.

D20. The method of any of paragraphs D18-D19, wherein the selecting the one or more sealing adapters includes selecting such that each of the first sealing surface and/or a/the second sealing surface of at least one of the one or more sealing adapters is configured to receive and/or engage a respective sealing component that corresponds to a pressure rating of the DUT.

D21. The method of any of paragraphs D18-D20, wherein the selecting the one or more sealing adapters includes selecting such that a/the stud receiver radius of each stud receiver of the plurality of stud receivers is at least substantially equal to a bolt circle radius corresponding to each mounting stud of the plurality of mounting studs.

D22. The method of any of paragraphs D18-D21, wherein the selecting the one or more sealing adapters includes selecting such that a/the minimum notch radius is smaller than a/the bolt circle radius corresponding to each mounting stud of the plurality of mounting studs.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It also is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure, the preceding numbered paragraphs, or the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A sealing adapter for fluidly coupling a device under test (DUT), which includes a DUT body and a plurality of mounting studs extending from the DUT body, to a corresponding seal head of a pressure testing system, the sealing adapter comprising:
   an adapter body that includes a first end with a first sealing surface, a second end, and a fluid passageway, wherein the first end and the second end are spaced apart from one another along an adapter axis of the sealing adapter, wherein the adapter body includes an exterior surface extending between the first end and the second end; and
   a mounting flange fixed to the adapter body, extending radially away from the exterior surface of the adapter body, and defining a plurality of stud receivers;
   wherein the sealing adapter is configured such that, during operative use of the sealing adapter, the sealing adapter is positioned between the DUT and the corresponding seal head such that each stud receiver of the plurality of stud receivers receives a respective mounting stud of the plurality of mounting studs.

2. The sealing adapter of claim 1, wherein the mounting flange is configured to engage the plurality of mounting studs of the DUT such that the sealing adapter is at least partially supported by the DUT during operative use of the sealing adapter.

3. The sealing adapter of claim 1, wherein each stud receiver of the plurality of stud receivers is a notch formed in a peripheral region of the mounting flange.

4. The sealing adapter of claim 1, wherein the mounting flange extends only partially circumferentially around the adapter body.

5. The sealing adapter of claim 1, wherein the mounting flange extends fully circumferentially around the adapter body.

6. The sealing adapter of claim 1, wherein the fluid passageway fluidly interconnects the first end and the second end; wherein the first sealing surface is configured to engage a first sealing component to form a fluid seal between the first sealing surface and a fluid opening of the DUT during operative use of the sealing adapter; wherein the second end includes a second sealing surface; wherein the second sealing surface is configured to engage a second sealing component to form a fluid seal between the second sealing surface and the corresponding seal head during operative use of the sealing adapter; and wherein one or both of the first sealing component and the second sealing component includes one or more of a sealing gasket, a ring type joint (RTJ) gasket, an O-ring, a sealing surface, and a polyurethane sealing surface.

7. The sealing adapter of claim 1, further comprising a lifting member configured to be engaged by a lifting apparatus to lift the sealing adapter; wherein the lifting member comprises one or more of a hook, a ring, a shackle, and a chain link.

8. The sealing adapter of claim 7, wherein the lifting member is at least substantially aligned with a center of mass of the sealing adapter.

9. A pressure testing system for performing pressure testing of a DUT, the pressure testing system comprising:
   a frame;
   a clamp structure supported by the frame and configured to operatively support the DUT; and
   a pressurizing assembly for delivering a pressurized fluid to the DUT;
   wherein the clamp structure includes at least one of the sealing adapter of claim 1.

10. The pressure testing system of claim 9, wherein the clamp structure includes:
    a first seal head;
    a second seal head spaced apart from the first seal head; and
    a force transmitting member configured to force the DUT into sealing engagement with at least a portion of the clamp structure when the DUT is positioned between the first seal head and the second seal head;
    wherein each sealing adapter of the at least one sealing adapter is configured to be positioned between the DUT and one of the first seal head and the second seal head during operative use of the pressure testing system.

11. The pressure testing system of claim 10, wherein the pressure testing system is configured to be utilized to test a DUT that includes the plurality of mounting studs; wherein the at least one sealing adapter is configured to space the DUT apart from one or both of the first seal head and the second seal head by an adapter spacing distance during operative use of the pressure testing system; and wherein the pressure testing system is configured such that the adapter spacing distance is greater than a length of each of the plurality of mounting studs.

12. The pressure testing system of claim 10, wherein the at least one sealing adapter includes:
    (i) a first sealing adapter configured to be positioned between the first seal head and the DUT during operative use of the pressure testing system; and
    (ii) a second sealing adapter configured to be positioned between the second seal head and the DUT during operative use of the pressure testing system.

13. The pressure testing system of claim 12, wherein the first seal head includes a first seal plate that is configured to sealingly engage the first sealing adapter during operative use of the pressure testing system; wherein the second seal head includes a second seal plate that is configured to sealingly engage the second sealing adapter during operative use of the pressure testing system; and wherein one or both of:

(i) the first seal head includes a first seal plate cradle that is configured to receive and support the first seal plate when the first seal plate is operatively installed in the first seal head; and (ii) the second seal head includes a second seal plate cradle that is configured to receive and support the second seal plate when the second seal plate is operatively installed in the second seal head.

14. The pressure testing system of claim 13, wherein the pressurizing assembly includes:

a pressurized fluid circuit through which the pressurized fluid flows during operative use of the pressure testing system; and a pressurized fluid supply source configured to pressurize the pressurized fluid and to flow the pressurized fluid through the pressurized fluid circuit;

wherein the pressurized fluid circuit includes one or more of:

(i) one or more pressurized fluid supply lines fluidly coupled to the pressurized fluid supply source; and (ii) a clamp structure fluid conduit formed by one or more of the first seal head, the first seal plate, the first sealing adapter, the DUT, the second sealing adapter, the second seal plate, and the second seal head.

15. The pressure testing system of claim 9, further comprising a DUT rotation mechanism for selectively rotating the clamp structure relative to the frame during operative use of the pressure testing system; wherein the DUT rotation mechanism is configured to selectively rotate the clamp structure relative to the frame through a DUT rotation angle that is at least 30 degrees and at most 90 degrees.

16. A method of pressure testing a DUT that includes a plurality of mounting studs with the pressure testing system of claim 9, the method comprising:

operatively coupling the DUT to the pressure testing system; and delivering the pressurized fluid to the DUT;

wherein the operatively coupling the DUT to the pressure testing system includes mounting the at least one sealing adapter on the DUT such that each of the plurality of stud receivers receives a respective mounting stud of the plurality of mounting studs.

17. The method of claim 16, wherein the mounting the at least one sealing adapter on the DUT includes mounting such that the plurality of mounting studs supports the at least one sealing adapter.

18. The method of claim 16, wherein the operatively coupling the DUT to the pressure testing system includes:

positioning the DUT between a first seal head and a second seal head of the clamp structure; and subsequent to the positioning the DUT between the first seal head and the second seal head, applying a compressive force to the DUT with a force transmitting member of the pressure testing system to form a clamp structure fluid conduit.

19. The method of claim 16, further comprising, subsequent to the operatively coupling the DUT to the pressure testing system, rotating the clamp structure relative to the frame through a DUT rotation angle that is at least 30 degrees and at most 90 degrees.

20. The method of claim 16, further comprising, prior to the operatively coupling the DUT to the pressure testing system, selecting the at least one sealing adapter from among a plurality of sealing adapters based, at least in part, on one or more properties of the DUT.

* * * * *